United States Patent [19]
Enari

[11] Patent Number: 6,014,442
[45] Date of Patent: Jan. 11, 2000

[54] DECRYPTING METHOD AND ELECTRONIC DEVICE

[75] Inventor: Masahiko Enari, Kanagawa, Japan

[73] Assignee: Sony Corporation, Tokyo, Japan

[21] Appl. No.: 08/791,227

[22] Filed: Jan. 30, 1997

[30]     Foreign Application Priority Data

Feb. 2, 1996    [JP]    Japan .................................. 8-039099

[51] Int. Cl.[7] ............................................... H04K 9/00
[52] U.S. Cl. ................................. 380/4; 380/21; 380/25
[58] Field of Search .............................. 395/186, 188.01;
                                                    380/4, 29, 21

[56]            References Cited

U.S. PATENT DOCUMENTS 4,982,429   1/1991  Takaragi et al. .
  5,103,479   4/1992  Takaragi et al. .
  5,509,071   4/1996  Petrie, Jr. et al. .......................... 380/4
  5,661,799   8/1997  Nagel et al. ................................ 380/4
  5,692,049  11/1997  Johnson et al. ........................... 380/25
  5,805,712   9/1998  Davis ........................................ 380/50
  5,812,666  10/1998  Baker et al. .............................. 380/21

FOREIGN PATENT DOCUMENTS 1-276189  11/1989  Japan .

*Primary Examiner*—Tod R. Swann
*Assistant Examiner*—Todd Jack
*Attorney, Agent, or Firm*—Frommer Lawrrence & Haug, LLP.; William S. Frommer

[57]              ABSTRACT

PID information and TSC information are extracted from a header of received data inputted to a terminal 1 and are supplied to an IDT (16). The IDT (16) receives these information and searches a data key from a DPMEM (17) by an indirect retrieving method and reads the data key. Plural data keys updated every predetermined period are non-synchronously written to the DPMEM (17). This writing operation is inhibited when the writing and reading operations of the DPMEM (17) are performed in the same timing and the same address. Thus, memory control of the DPMEM (17) can be easily performed. Accordingly, all decryption processings can be completed in real time on a reception side.

8 Claims, 19 Drawing Sheets

Decryption

[Encryption] / [Decryption]

Initial Value C(0)=IV
C(i)=EKs(M(i).EOR.C(i-1))

M(i)=DKs(C(i)).EOR.C(i-1))

CBC(Cypher Block Chaining)Mode

[Encryption] / [Decryption]

OFB(Output Feedback)Mode

FIG. 7

| HADD[8..0] | Contents | Number of bits |
|---|---|---|
| 0 0010 0×× × | CBC INITIAL VALUE TABLE | 64bits×1 |
| 0 010× ×××× | SYSTEM_KEY TABLE | 256bits×1 |
| 0 100× ×××× | PID VALUE TABLE | 13bits×12 |
| 1 0××× ×××× | KS_EVEN VALUE TABLE | 64bits×12 |
| 1 1××× ×××× | KS_ODD VALUE TABLE | 64bits×12 |

FIG. 8

| Inputs A,B | Outputs A,B |
|---|---|
| A=B | 1 |
| A=B | 0 |
| A<B | 0 |
| A>B | 0 |

FIG. 9

| | Inputs | | | | | | | | | | | | | Outputs | | | | |
|---|---|---|---|---|---|---|---|---|---|---|---|---|---|---|---|---|---|---|
| D11 | D10 | D9 | D8 | D7 | D6 | D5 | D4 | D3 | D2 | D1 | D0 | | TMP3 | TMP2 | TMP1 | TMP0 | NK |
| X | X | X | X | X | X | X | X | X | X | X | 1 | | 0 | 0 | 0 | 0 | 0 |
| X | X | X | X | X | X | X | X | X | X | 1 | 0 | | 0 | 0 | 0 | 1 | 0 |
| X | X | X | X | X | X | X | X | X | 1 | 0 | 0 | | 0 | 0 | 1 | 0 | 0 |
| X | X | X | X | X | X | X | X | 1 | 0 | 0 | 0 | | 0 | 0 | 1 | 1 | 0 |
| X | X | X | X | X | X | X | 1 | 0 | 0 | 0 | 0 | | 0 | 1 | 0 | 0 | 0 |
| X | X | X | X | X | X | 1 | 0 | 0 | 0 | 0 | 0 | | 0 | 1 | 0 | 1 | 0 |
| X | X | X | X | X | 1 | 0 | 0 | 0 | 0 | 0 | 0 | | 0 | 1 | 1 | 0 | 0 |
| X | X | X | X | 1 | 0 | 0 | 0 | 0 | 0 | 0 | 0 | | 0 | 1 | 1 | 1 | 0 |
| X | X | X | 1 | 0 | 0 | 0 | 0 | 0 | 0 | 0 | 0 | | 1 | 0 | 0 | 0 | 0 |
| X | X | 1 | 0 | 0 | 0 | 0 | 0 | 0 | 0 | 0 | 0 | | 1 | 0 | 0 | 1 | 0 |
| X | 1 | 0 | 0 | 0 | 0 | 0 | 0 | 0 | 0 | 0 | 0 | | 1 | 0 | 1 | 0 | 0 |
| 1 | 0 | 0 | 0 | 0 | 0 | 0 | 0 | 0 | 0 | 0 | 0 | | 1 | 0 | 1 | 1 | 0 |
| 0 | 0 | 0 | 0 | 0 | 0 | 0 | 0 | 0 | 0 | 0 | 0 | | 1 | 1 | 1 | 1 | 1 |

X = Do not care

Fundamental Function

Decryption Core

Encryption Core

DECRYPTING METHOD AND ELECTRONIC DEVICE

FIELD OF THE INVENTION

The present invention relates to a decrypting method and an electronic device for receiving transmitted data scrambled by encryption and decrypting the transmitted data.

BACKGROUND OF THE INVENTION

An encrypting decrypting system for obtaining original information by encrypting transmitted information and receiving and decrypting the encrypted transmitted information is conventionally known to keep information in communication secret. An encryption algorithm such as a DES (Data Encryption Standard) as a standard system in USA is known as such an encrypting decrypting system.

There are various kinds of encryption algorithms and more excellent encrypting systems with respect to safety and high speed are developed. Encrypting systems (MULTI2 system) described in specifications of U.S. Pat. Nos. 4,982,429 and 5,103,479 and Japanese Laid-Open Patent No. 1-276189, etc. are known as one example.

There are an encrypting system registered as ISO9979/0009 and an encryption utilizing mode registered as ISO/IEC10116 in the International Standardization Organization (ISO).

In the encrypting system of the above MULTI2 system, In the encrypting system of the above MULTI2 system, an input data size is set to 64 bits and an output data size is set to 64 bits. A work key of a 256-bit size required to perform encryption is generated from a system key of the 256-bit size and a data key of 64 bits. Further, the number of encrypting stages is set to a positive integer.

FIG. 1 shows the schematic construction of an encryption algorithm in this MULTI2 system. In the MULTI2 system, as shown in FIG. 1, a calculation of the encryption algorithm is made by using the system key J of 256 bits in the data key Ks of 64 bits so that the work key Kw of 256 bits is generated. The calculation of this encryption algorithm is executed by an encryption algorithm executing means C. The generated work key Kw is supplied to an encryption algorithm executing means F and an inputted plain text of 64 bits is encrypted. The encryption algorithms executed by the encryption algorithm executing means C and the encryption algorithm executing means F are the same encryption algorithm.

Such an encryption algorithm is a basic encryption algorithm of the MULTI2 system. However, in this encryption algorithm, there is a fear that a distribution of appearing frequencies of characters or words is statistically processed in advance and the plain text is presumed by making matching with respect to the frequency distribution of a character series pattern of an obtained encrypted text.

Therefore, there is a technique for making a cipher text by performing an exclusive-OR operation between an encrypting block of encrypted 64 bits and input data of 64 bits next inputted. An encrypting mode using this technique is called a CBC (Cipher Block Chaining) mode. An encryption algorithm in such a CBC mode is executed in the above-mentioned encryption algorithm executing means F.

For example, there is a communication system such as a packet communication in which a unit of communicated data is determined in advance. However, data are left when a data unit unable to be divided by a bit number of one block is inputted in a block encrypting system with 64 bits as one block. Therefore, fractional processing of these left data is performed in an OFB (Output Feedback) mode.

In this OFB mode, a fractional portion of the data is supplied to an encryption algorithm executing means G and is encrypted by using a random number. This random number is generated by the encryption algorithm executing means G using the work key Kw. Thus, a cipher text with 64 bits as one block can be obtained. Each of the CBC mode and the OFB mode is called an encryption utilizing mode.

FIG. 2 shows the schematic construction of a decryption algorithm in the MULTI2 system. As shown in FIG. 2, the work key Kw of 256 bits is generated by making the calculation of the encryption algorithm using the system key J of 256 bits in the data key Ks of 64 bits. The calculation of this encryption algorithm is executed by an encryption algorithm executing means c. The generated work key Kw is supplied to a decryption algorithm executing means f and the inputted cipher text of 64 bits is decrypted.

The cipher text encrypted in the OFB mode is supplied to an encryption algorithm executing means g and is decrypted by using a random number generated by the encryption algorithm executing means g using the work key Kw. Thus, the cipher text with 64 bits as one block is decrypted so that a plain text of 64 bits can be obtained. When the CBC mode is set, the decryption algorithm executing means f executes a decryption algorithm in the CBC mode.

Here, the encryption utilizing mode will be explained with reference to FIG. 3. FIG. 3A shows the schematic constructions of encryption and decryption in the CBC mode. FIG. 3B shows the schematic constructions of encryption and decryption in the OFB mode.

In the CBC mode, as shown in FIG. 3A, an i-th plain text block $M(i)$ is inputted to an exclusive-OR circuit 101 and an exclusive-OR operation is performed between this i-th plain text block $M(i)$ and a cipher text block $C(i-1)$ delayed by a register (REG) 103 and located by one block before. Calculated data are encrypted by a work key generated on the basis of a data key Ks in an encryption algorithm executing means 102. This encrypted i-th cipher text block $C(i)$ is represented as follows.

$$C(i)=EKs(M(i).EOR.C(i-1))$$

In the case, Eks(m) means that m is encrypted by Ks. EOR shows the calculation of the exclusive-OR.

This cipher text block $C(i)$ is transmitted and received on a reception side. The received cipher text block $C(i)$ is decrypted by the work key generated on the basis of the data key Ks in a decryption algorithm executing means 111 and is supplied to an exclusive-OR circuit 113. The cipher text block $C(i-1)$ delayed in a register (REG) 112 and located by one block before is also inputted to this exclusive-OR circuit 113 so that an exclusive-OR operation of both the text blocks is performed. At this time, data keys Ks on the transmission and reception sides are equal to each other. Thus, an i-th plain text block $M(i)$ is decrypted from the exclusive-OR circuit 113. The i-th plain text block $M(i)$ is represented as follows.

$$M(i)=DKs(C(i).EOR.C(i-1))$$

In this case, Dks(c) shows that c is decrypted by Ks.

At a time of the OFB mode, the i-th plain text block $M(i)$ is supplied to an exclusive-OR circuit 105. An output of an encryption algorithm executing means 104 provided as a random number by the work key generated on the basis of the data key Ks is supplied to this exclusive-OR circuit 105. The output of the encryption algorithm executing means 104 is delayed by one block by the register 103 and is returned to the encryption algorithm executing means 104. Thus, the cipher text block C(i) encrypted by the random number is outputted from the exclusive-OR circuit 105.

This cipher text block C(i) is then transmitted and received on the reception side. The received cipher text block C(i) is supplied to an exclusive-OR circuit 114. An output provided as a random number by using a work key generated on the basis of a data key Ks in an encryption algorithm executing means 115 is supplied to this exclusive-OR circuit 114. This output of the encryption algorithm executing means 115 is delayed by one block in the register (REG) 112 and is returned to the encryption algorithm executing means 115. In this case, the random number supplied to the exclusive-OR circuit 114 is equal to the random number supplied to the exclusive-OR circuit 105 so that the i-th plain text block M(i) is obtained from the exclusive-OR circuit 114.

FIG. 4 shows the schematic construction of an encrypting decrypting system having the encryption utilizing mode explained above.

In this figure, a scrambler 100 is arranged on the transmission side. Input data are scrambled and transmitted by the scrambler 100. The scrambled transmitted data are propagated through a transmitting path such as a space, etc. and are received on the reception side. A descrambler 110 is arranged on the reception side. The scrambled transmitted data are descrambled by this descrambler 110 and are returned to original data and are outputted.

The scrambler 100 is constructed by a CBC mode encrypting section and an OFB mode encrypting section. The CBC mode encrypting section is composed of an encryptor 102 as an encryption algorithm executing means for encrypting the inputted data (a plain text), a register 103 and an exclusive-OR circuit (EX-OR) 101. The OFB mode encrypting section is composed of an encryptor 104 as an encryption algorithm executing means and an exclusive-OR circuit (EX-OR) 105. An encryptor 106 for generating a work key from a data key and a system key is also arranged within the scrambler 100. The generated work key is supplied to the encryptors 102 and 104.

The encryptors 102, 104 and 106 have the same construction so that one encryptor can be commonly used as these three encryptors. The CBC mode encrypting section and the OFB mode encrypting section are operated as mentioned above. Accordingly, an explanation of these operations is omitted here.

The descrambler 110 is constructed by a CBC mode decrypting section and an OFB mode decrypting section. The CBC mode decrypting section is composed of a decryptor 111 as a decryption algorithm executing means for decrypting inputted received data (a cipher text), a register 112 and an exclusive-OR circuit (EX-OR) 113. The OFB mode decrypting section is composed of an encryptor 115 as an encryption algorithm executing means and an exclusive-OR circuit (EX-OR) 114. An encryptor 116 for generating a work key from a data key and a system key is also arranged within the descrambler 110. The generated work key is supplied to the decryptor 111 and the encryptor 115.

The encryptors 115 and 116 have the same construction so that one encryptor can be commonly used as these two encryptors. The CBC mode decrypting section and the OFB mode decrypting section are operated as mentioned above. Accordingly, an explanation of these operations is omitted here.

When a high grade encrypting decrypting system such as the above-mentioned MULTI2 system is realized and used in software, no real time processing can be performed at a calculating speed of the present arithmetic means. Namely, for example, when this system is applied to a satellite digital television broadcast, etc., it is necessary to regenerate an image and a voice in real time without interrupting the image and the voice. Accordingly, decrypting processing on the reception side must be performed by hardware capable of performing high speed processing.

However, hardware capable of completing all decrypting processes in real time on the reception side is large-sized since complicated processings are performed.

SUMMARY OF THE INVENTION

Therefore, it is a first object of the present invention to provide a decrypting method in which all decrypting processings of data scrambled in a high grade encrypting system can be completed in real time on a reception side by using compact hardware cheaply manufactured.

It is a second object of the present invention to provide a compact electronic device cheaply manufactured and having a decrypting means in which all decrypting processings of data scrambled in a high grade encrypting system can be completed in real time on a reception side.

To achieve the above first object, the present invention resides in a decrypting method comprising the steps of a writing step for writing plural key information to memory means; a reading step for reading any one of the key information designated by information in input data from the memory means; and a decrypting step for decrypting the input data on the basis of the key information read in the reading step; execution of the writing step being inhibited when executing periods of the writing step and the reading step overlap each other and write and read addresses are in conformity with each other.

To achieve the above first object, the present invention also resides in a decrypting method comprising the steps of a reading step for reading any one of key information from memory means storing plural key information on the basis of designated data among input data; and a decrypting step for decrypting the input data on the basis of the key information read in the reading step; the reading step being set such that the key information read from the memory means is searched by referring to a key table by the designated data, and a least key address is selected when two key addresses or more for reading the key information corresponding to the designated data exist in the key table.

To achieve the above first object, the present invention further resides in a decrypting method comprising the steps of a reading step for reading any one of key information from memory means storing plural key information on the basis of designated data among input data; and a decrypting step for decrypting the input data on the basis of the key information read in the reading step; the reading step being set such that a key address of the key information read from the memory means is searched by referring to a table by the designated data, and no key address is searched when no key address referred by the designated data exists in the table.

To achieve the above first object, the present invention furthermore resides in a decrypting method comprising the steps of an initial step for performing an initializing operation; a writing step for writing plural key information to memory means; a reading step for reading any one of the key information from the memory means on the basis of designated data among input data; and a decrypting step for decrypting the input data on the basis of the key information read in the reading step; the reading step being set such that a key address of the key information read from the memory means is searched by referring to a key table by the designated data, and initial processing being performed in the initial step such that there is no corresponding key address as a result of the search within an initializing period.

An electronic device of the present invention for achieving the above second object comprises at least decrypting means for executing any one of the above-mentioned decrypting methods.

In accordance with such decrypting methods of the present invention, it is possible to suitably control the reading and writing operations of the memory means into which key information required to perform the decryption processing is stored. Therefore, a decrypting method capable of easily performing the memory control can be provided. Accordingly, it is possible to provide a decrypting method capable of executing all decryption processings in real time on a reception side.

Further, the construction of a memory control means in the electronic device having the decrypting means for executing each of such decrypting methods can be simplified so that the electronic device can be made compact and cheaply manufactured.

BRIEF DESCRIPTION OF THE DRAWINGS

FIG. 7 is a chart showing a memory space of a register in the decryptor seen from a CPU shown in FIG. 5;

FIG. 8 is a chart showing a logic table of comparators CP0 to CP11 of the IDT shown in FIG. 6;

FIG. 9 is a chart showing a logic table of PE of the IDT shown in FIG. 6;

DETAILED DESCRIPTION OF THE PREFERRED EMBODIMENT

Figure 5:
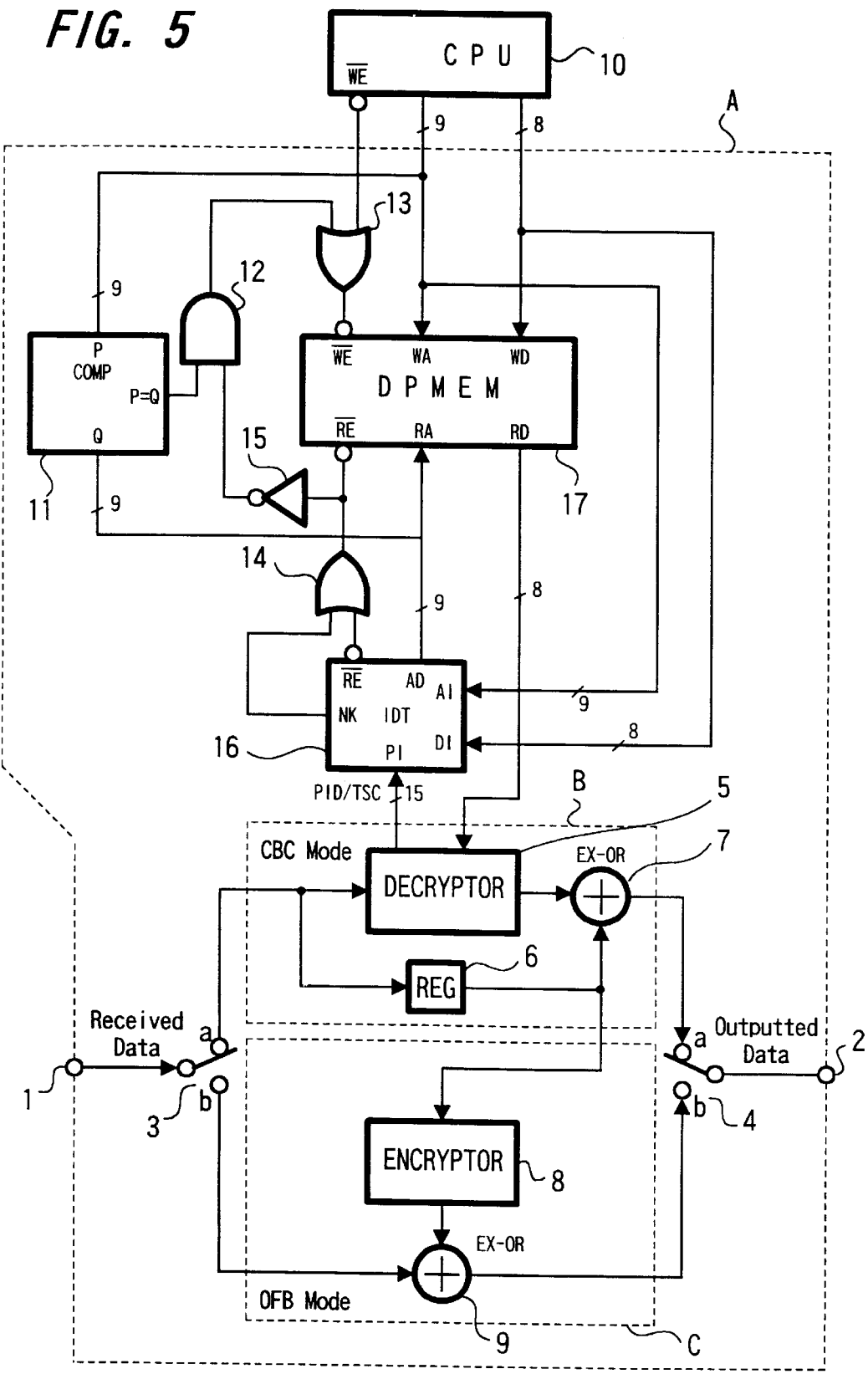
FIG. 5 is a block diagram showing an example of the construction of a decryptor in an embodiment form of a decrypting method of the present invention.

FIG. 5 is a block diagram showing a constructional example of a decryptor in an embodiment form of a decrypting method of the present invention.

In this figure, a decryptor A is constructed by a decrypting section B in a CBC mode, a decrypting section C in an OFB mode, a data key indirect retrieving device (IDT) 16 having a packet ID (PID) table, a dual port memory (DPMEM) 17 and a comparator (COMP) 11. The dual port memory 17 transmits a data key used to encrypt input data to the decrypting sections B and C. The comparator (COMP) 11 compares a write address and a read address of the DPMEM 17 with each other.

Cipher text data as received data are inputted to a terminal 1 of the decryptor A and are inputted to a switching means 3. At this time, when the CBC mode is set, each of the switching means 3 and a switching means 4 is switched onto the side of a contact a and the inputted cipher text data are supplied to the CBC mode decrypting section B and are decrypted and outputted. When the OFB mode is set, each of the switching means 3 and the switching means 4 is switched onto the side of a contact b and the cipher text data are inputted to the OFB mode decrypting section C. The inputted cipher text data are decrypted in the OFB mode decrypting section C and plain text data are outputted.

Figure 1:
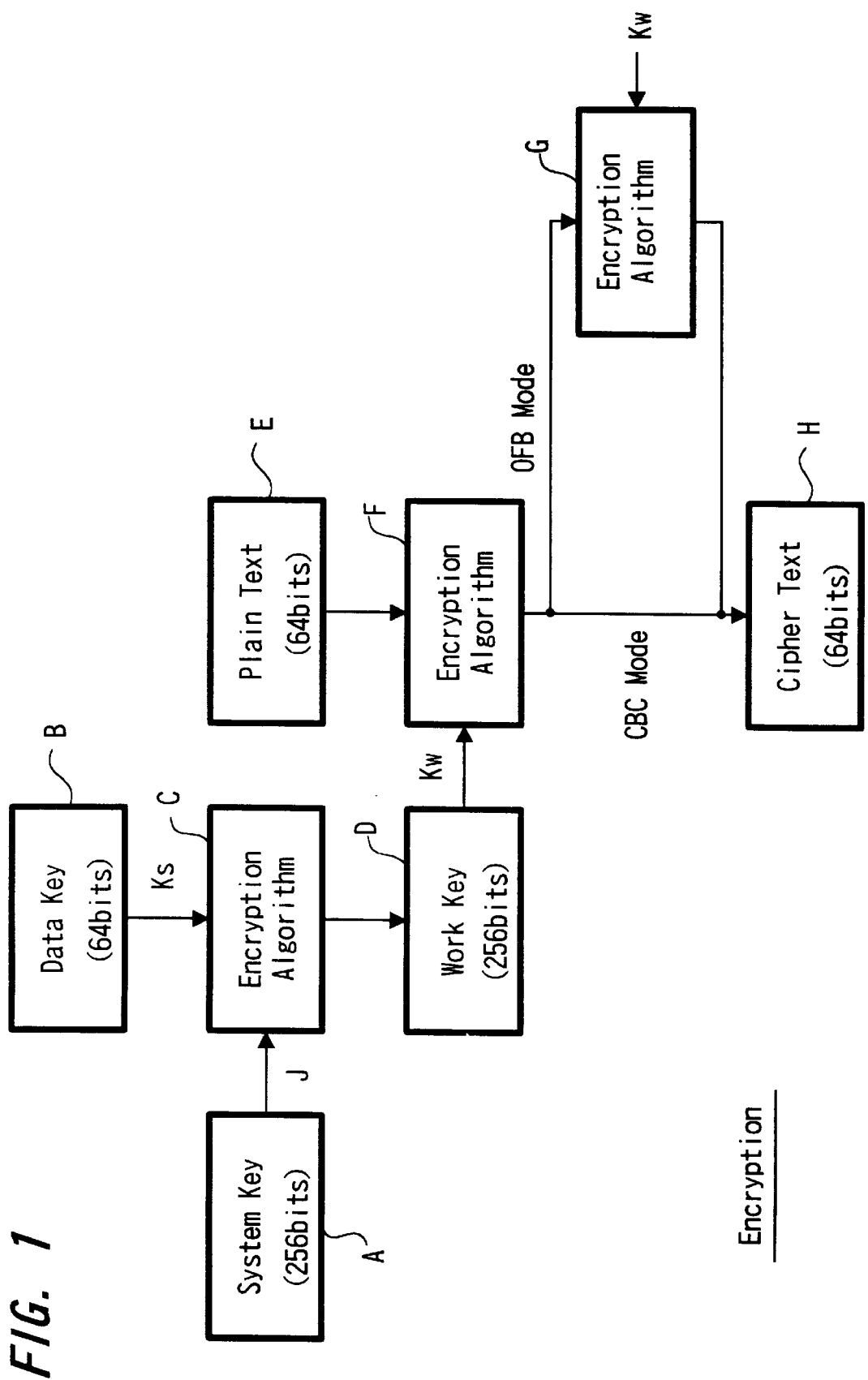
FIG. 1 is a view showing a conventional encryption algorithm.
Figure 2:
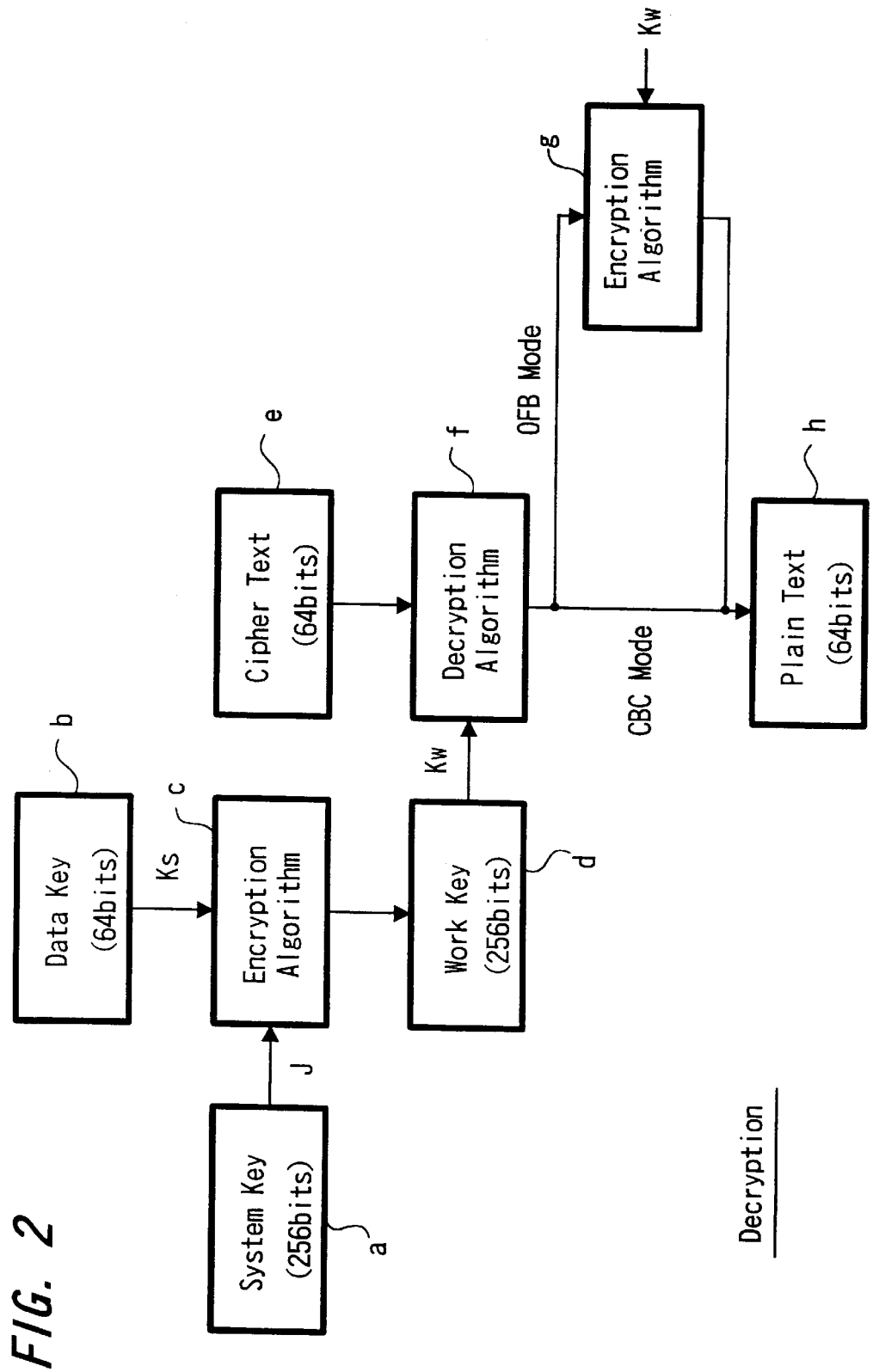
FIG. 2 is a view showing a conventional decryption algorithm.
Figure 3A:
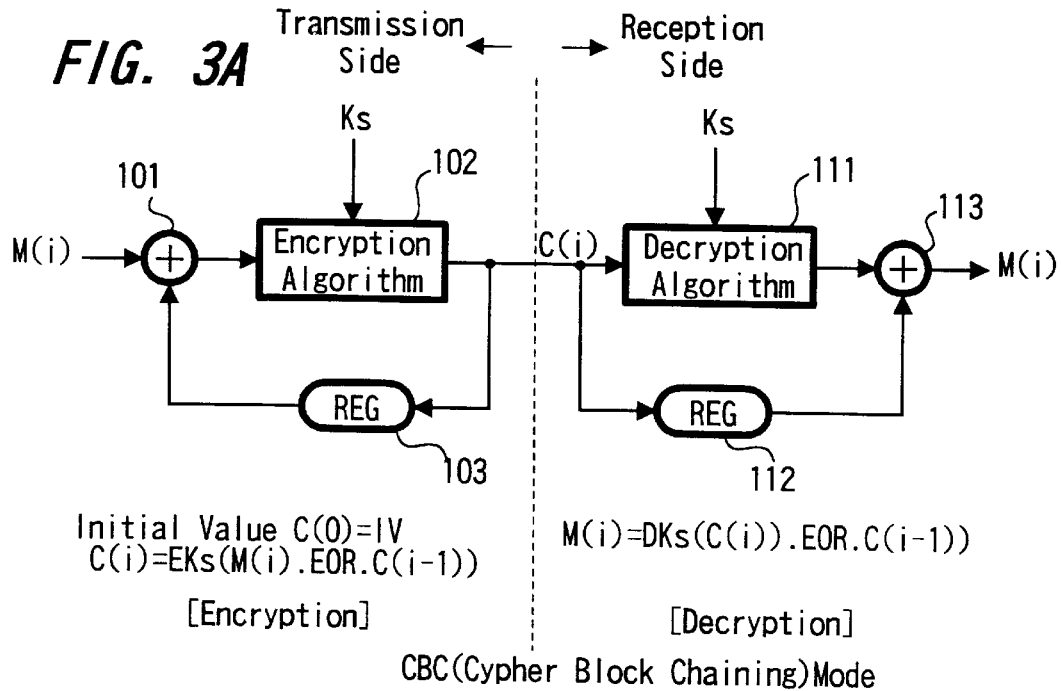
FIG. 3A–B is a view showing the construction of an encryption utilizing mode composed of a CBC mode and an OFB mode.
Figure 3B:
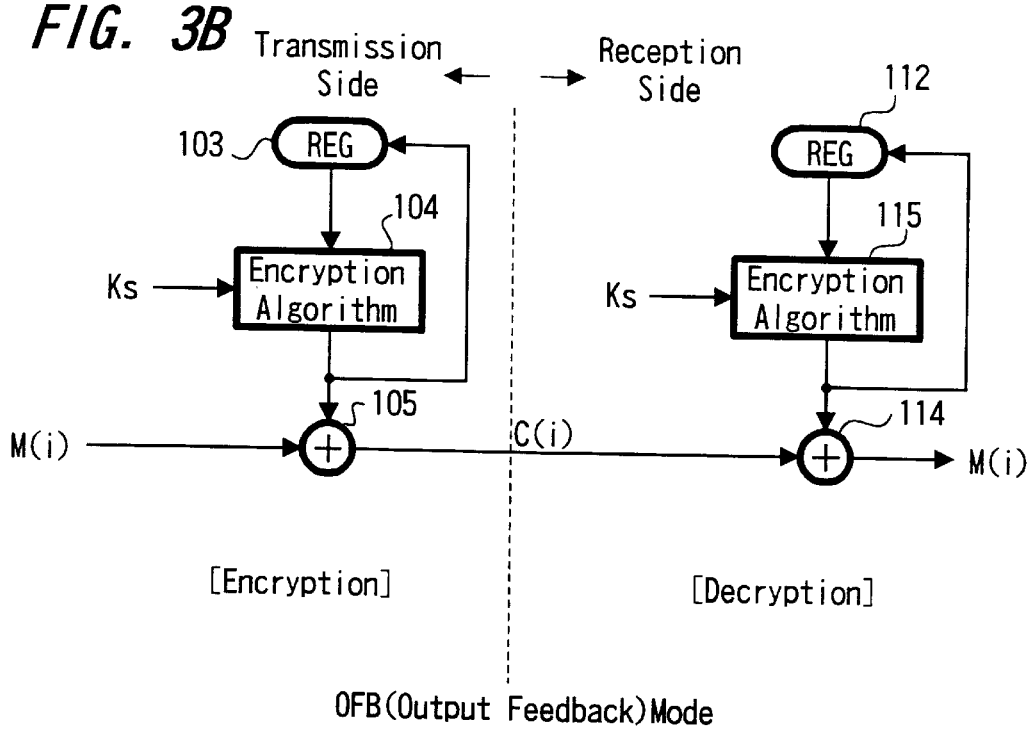

The inputted cipher text data are decrypted and are set to plain text data in the CBC mode decrypting section B and the OFB mode decrypting section C, and its decryption algorithm is similar to that shown in FIG. 2. In this case, a data key required for the decryption processing is supplied from the DPMEM 17.

For example, a format of the received data inputted to the terminal 1 is set to a transport stream (hereafter, called TS) prescribed as ISO/IEC13818. TS has a packet structure of 188 bytes and is constructed such that a pay load of 184 bytes normally follows a header of 4 bytes. Further, a parity is added to make an error correction with respect to a transmission error. Accordingly, a dummy period for the parity of 16 bytes is added and a stream of these repetitions is set.

The header of this TS includes PID information showing whether the packet is constructed by video data, voice data or other data, a TSC (Transport Scrambling Control) flag showing whether it is an encrypted TS or not, etc. Attributes of these packets are interpreted by analyzing the header in an unillustrated analyzing section.

At this time, when it is interpreted as a packet not encrypted by the TSC, this TS is outputted as it is through a delay section without performing decryption processing. A delay time of this delay section is set to be equal to a time of the decryptor A required for the decryption processing.

A data key Kse (Ks_even) and a data key Kso (Ks_odd) are allocated to one PID. This is because a data key is updated every several seconds to several ten seconds so that it is necessary to rewrite the data key in time for the update, and only one of the data key Kse and the data key Kso is used at a decryption processing time so that the unused data key can be set to be updated. Namely, the data key Kse and the data key Kso are allocated to one PID so as to easily perform updating control for updating the data key.

For example, the above analyzing section is arranged in the CBC mode decrypting section B although this arrangement is not illustrated. PID/TSC information of a data size of 15 bits is transmitted from the CBC mode decrypting section B to the IDT 16.

In the IDT 16, the PID table is referred by using the received PID information of a 13-bit size. The IDT 16 generates a read address RA (9 bits in data size) of the DPMEM 17 by combining address information read from the PID and TSC information of a 2-bit size. The generated read address RA is supplied from an AD terminal to an RA terminal of the DPMEM 17 and a control operation is performed at this time such that a read enable (RE) signal attains an active state. Thus, a data key corresponding to the read address RA is read from the DPMEM 17. The read data key is equal to a data key used at an encrypting time of the inputted TS and is outputted from a terminal RD to the decryptor 5.

The decryptor 5 generates a work key from the supplied data key and a system key from every different system. The decryptor 5 decrypts inputted cipher text data on the basis of the generated work key.

The system key is transmitted from the CPU 10 to the decryptor A in advance.

The CPU 10 is constructed such that the updated data key required for the decrypting sections B and C is written to the DPMEM 17 before this data key is required in the decryption processing. In a writing case of this data key, a write enable (WE) signal is set to attain an active state, and a write address (WA) of a data size of 9 bits and write data (WD) of the data key of a data size of 8 bits are supplied to the DPMEM 17. In this case, a ROM and a RAM are arranged in the CPU 10 and data provided to the decryptor A are written to these memories.

Read data become indefinite at a writing time of data key information to the DPMEM 17 when the IDT 16 reads the data key at the same read address as the write address. Accordingly, writing to the DPMEM 17 is inhibited at this time.

Therefore, a comparator 11, an AND gate 12, OR gates 13, 14 and an inverter 15 are arranged. Operations of these elements will next be explained. The read address RA outputted from the IDT 16 and the write address WA outputted from the CPU 10 are respectively inputted to a P-terminal and a Q-terminal of the comparator 11. When input data at the P-terminal and input data at the Q-terminal are in conformity (P=Q) with each other, a high voltage level signal is outputted from the comparator 11. At this time, when an inverting signal RE attains an active state at a low voltage level, a high voltage level signal is outputted from the inverter 15. Accordingly, a high voltage level signal is finally outputted from the AND gate 12. This output of the AND gate 12 is inputted to the OR gate 13 and an output of the OR gate 13 is set to a high voltage level. Accordingly, an inverting signal WE attains an inactive state and writing to the DPMEM 17 is inhibited.

FIG. 7 shows a memory space of a register of the decryptor A seen from the CPU 10. An area of 64 bits×1 with upper 6 bits at an address (HADD) of a data size of 9 bits as "000100" is allocated to an initial value table (CBC initial value table) in the CBC mode. An initial value stored to this initial value table is supplied to the CBC mode decrypting section B and is set to a register 6 at a time of initial processing executed at a power turning-on time, etc.

An area of 256 bits×1 with upper 4 bits at the address (HADD) as "0010" is also allocated to a system key table (SYSTEM_Key table). This system key table is set to be different every system, but is a fixed key in one system.

Further, an area of 13 bits×12 with upper 4 bits at the address (HADD) as "0100" is allocated to a PID table (PID value table). This PID table is information showing a packeted data kind and is set to 12 kinds at its maximum in one channel and is also set to PIDs different every data kind.

The system key table is written to a predetermined register and information of the PID table is written to the IDT 16 from the CPU 10 at the initial processing time.

Furthermore, an area of 64 bits×12 with upper two bits at the address (HADD) as "10" is allocated to a data key Kse table (Ks_even value table). An area of 64 bits×12 with upper two bits at the address (HADD) as "11" is allocated to a data key Kso table (Ks_odd value table). Information of this data key Kse table and the data key Kso table is written to the DPMEM 17 and is updated by the CPU 10 every predetermined timing of several seconds to several ten seconds.

Figure 6:
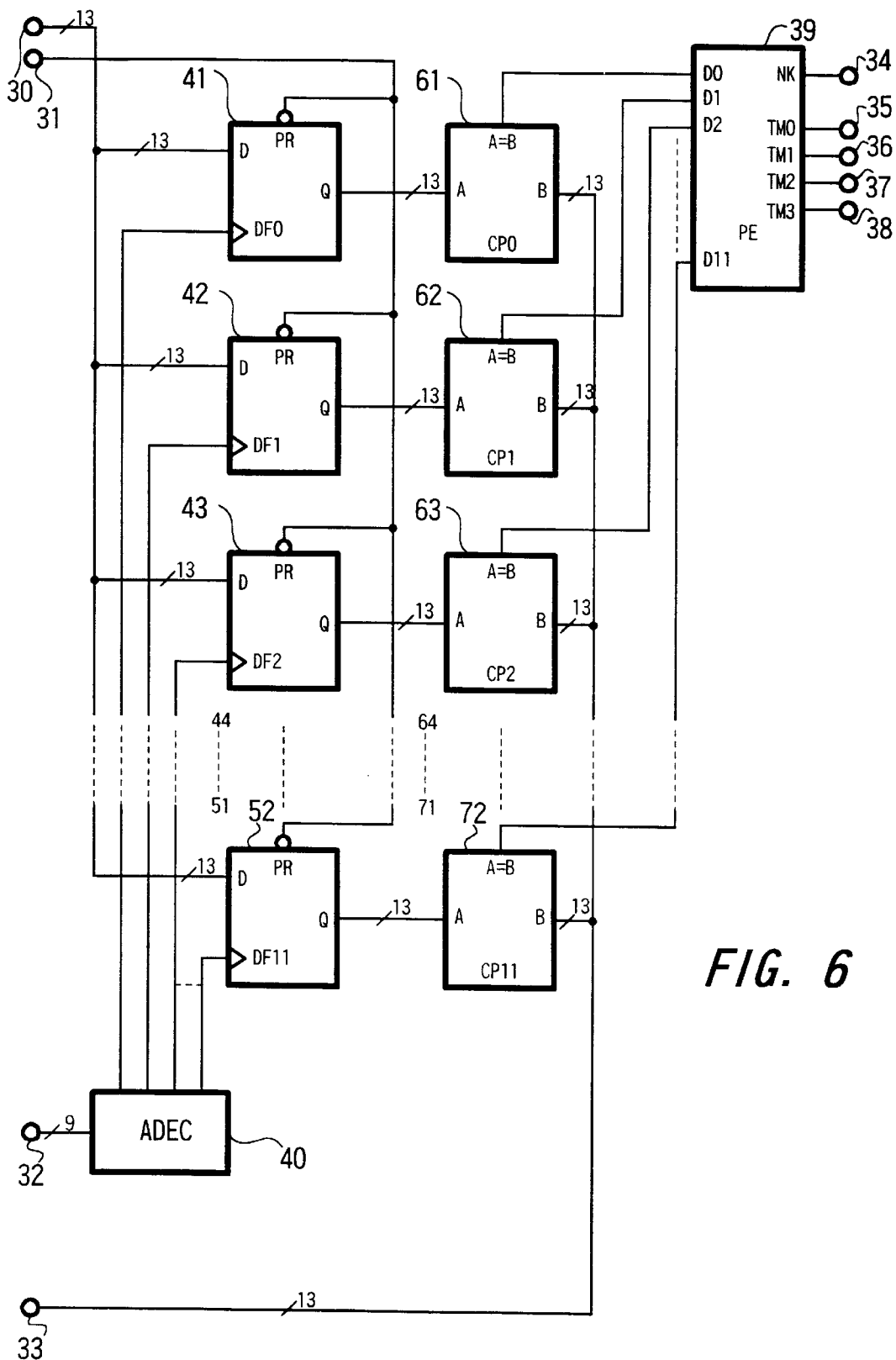
FIG. 6 is a block diagram showing the construction of an IDT in the decryptor shown in FIG. 5.

FIG. 6 is a block diagram showing one example of a detailed construction of the IDT 16. In this figure, reference numerals 41 to 52 designate 12 flip flops (DF0 to DF11) each having a 13-bit width. Reference numerals 61 to 72 designate 12 comparators (CP0 to CP11) each having a 13-bit width. Reference numeral 40 designates an address decoder (ADEC). When address information of a data size of 9 bits is inputted to this address decoder 40, an output for setting any one of the flip flops DF0 to DF11 to be active is transmitted from this address decoder 40 to only one of 12 outputs. Further, reference numeral 39 designates a priority encoder (PE). This priority encoder 39 outputs address information TMP0 to TMP3 combined with TSC information.

In this IDT 16, PID information of a data size of 8 bits outputted from the CPU 10 is developed to a data size of 13 bits and is inputted to a terminal 30. Address information of a data size of 9 bits outputted from the CPU 10 is also inputted to a terminal 32 and is decoded in the ADEC 40. This decoded output is inputted to the flip flops DF0 to DF11 as a strobe signal and only any one of these flip flops DF0 to DF11 is set to be able to be latched.

AT this time, the inputted PID information of a data size of 13 bits is commonly inputted to the 12 flip flops DF0 to DF11. The flip flops DF0 to DF11 are sequentially selected one by one by the decoded output of the ADEC 40 and the supplied PID information is latched. Thus, the PID information of 12 kinds at its maximum can be latched to the flip flops DF0 to DF11 and a PID table is constructed by the flip flops DF0 to DF11.

The PID information of a data size of 13 bits is inputted to a terminal 33 and is commonly inputted to a B-input terminal of each of comparators CP0 to CP11. This PID information is PID information of a data size of 13 bits among PID/TSC information of a data size of 15 bits extracted from the header of a packet as received data in the CBC mode decrypting section B and supplied to the IDT 16.

In this case, PID information from the flip flops DF0 to DF11 are respectively inputted to A-terminals of the comparators CP0 to CP11. A conformity signal is outputted from a comparator in which PID information conforming to the PID information inputted from the terminal 33 is outputted is inputted to the A-terminal. Accordingly, when the PID information in the PID table is inputted from the terminal 33, the conformity signal is outputted from any one of the comparators CP0 to CP11.

FIG. 8 shows a logic table of these comparators CP0 to CP11. When no "1" is inputted to all the A and B terminals of the comparators CP0 to CP11, a "1" signal is outputted at a conformity (A=B) time. In contrast to this, "0" is outputted at a non-conformity time.

FIG. 9 further shows a logic table of the priority encoder PE39. In the logic table of this priority encoder PE39, for example, when a "1" signal is outputted from a comparator CP2, the priority encoder PE39 outputs data of 4 bits (TMP0 to TMP3) of "0010". As shown in FIG. 9, D0 is set to an input having a highest priority and D11 is set to an input having a lowest priority in this priority encoder PE39.

There is a case in which PID information not conforming to the PID information of the PID table set to the flip flops DF0 to DF11 is inputted. In this case, "0" is inputted to all input terminals of the priority encoder PE. At this time, an NK output of the priority encoder PE is set to "1". When the NK output is "1", a reading operation of the key table of a data key described later is inhibited.

A voltage level at the terminal 31 becomes "0" and all the flip flops DF0 to DF11 are preset at an initial processing time such as a power turning-on time, etc. so that "1" is outputted from the flip flops DF0 to DF11. Accordingly, in this case, "0" is outputted from all the comparators CP0 to CP11 and the reading operation of the key table of the data key is inhibited as mentioned above.

When the reading operation of the key table is inhibited, no key table is used so that a data key can be written to this key table from the CPU 10. Namely, the data key can be initialized. The terminal 31 is a power-on reset terminal and its voltage level is returned to "1" after a predetermined time.

An operation for searching the key table of the data key will next be explained by PID information and TSC information among received data with reference to FIG. 10.

Figure 10:
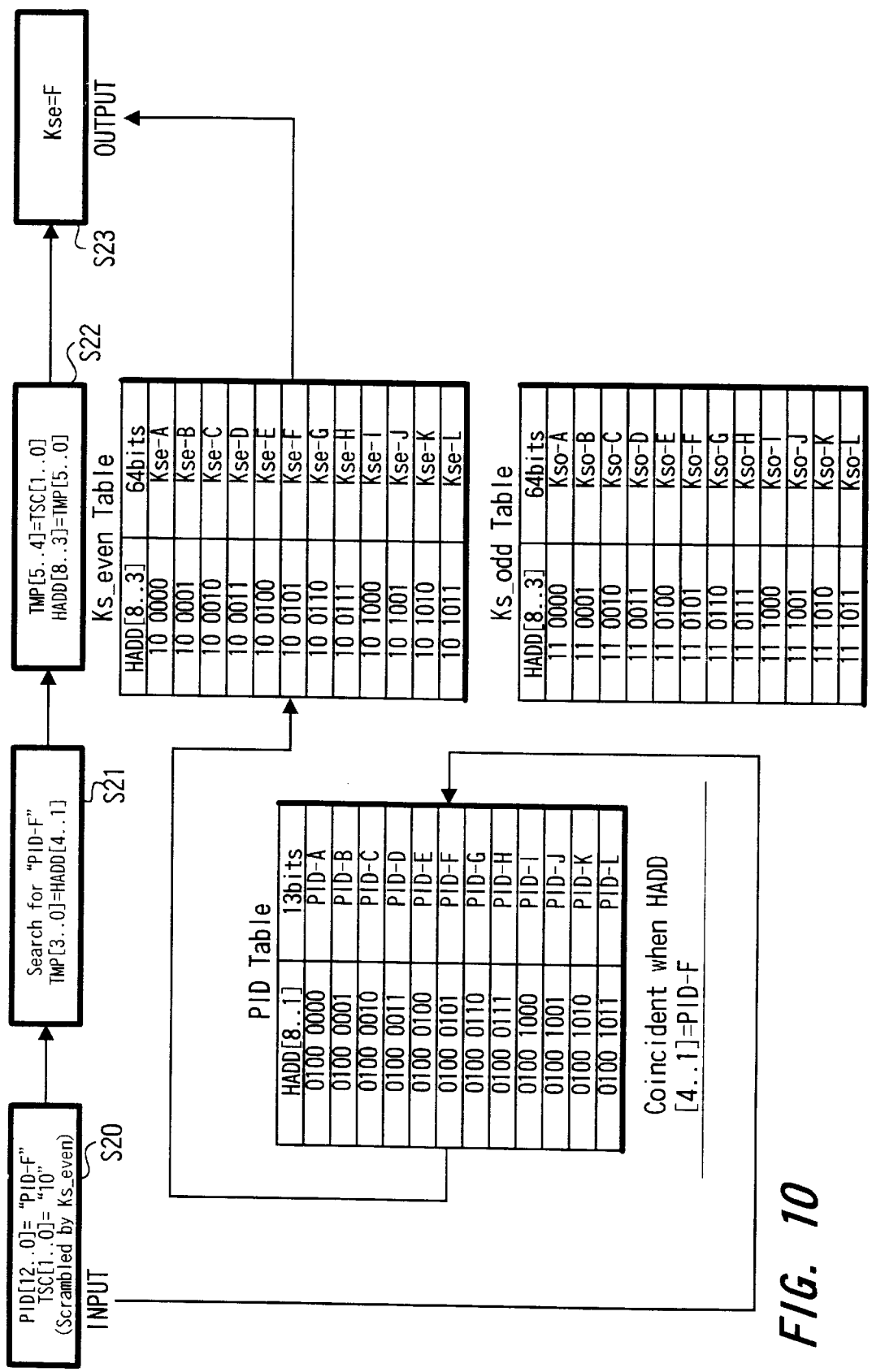
FIG. 10 is a view for explaining a method for searching a data key by an indirect retrieving method from information in a header of input data in the decryptor shown in FIG. 5.

In a step S20 shown in FIG. 10, it is assumed that "PID-F" is inputted from the header of received data as the PID information of a data size of 13 bits, and "10" is inputted as the TSC information of a data size of 2 bits. This "10" is set to show that data are scrambled by the data key Kse.

Next, this PID information is inputted to the A-terminals of the comparators CP0 to CP11 in a step S21 and is compared with PID information stored to each of the flip flops DF0 to DF11. As a result, a "1" signal is outputted from a comparator CP5 and an output TMP [3..0] of TEMP3 to TEMP0 of the priority encoder PE39 becomes "0101". Namely, "PID-F" is searched. This "0101" as an output of the priority encoder PE39 is set to fourth to first bits at an address HADD.

Next, in a step S22, two bits ("10") of the TSC information TSC [1..0] are set to fifth and sixth bits at the address HADD and an address HADD [8..3] of a 6-bit size is generated. Accordingly, the address HADD [8..3] becomes "100101".

When the key table is then referred by the address HADD [8..3] of the generated "100101" in a step S23, a data key Kse-F of a 64-bit width is obtained from a Ks_even Table. Decryption of an inputted cipher text is executed by the decryptor A on the basis of the obtained data key Kse-F.

Thus, the decrypting method of the present invention is set to an indirect retrieving method for indirectly retrieving the data key. Accordingly, it is sufficient to prepare the key table of a 6-bit width without preparing the table of a 13-bit width corresponding to the PID information so that a memory capacity can be reduced and the memory can be made compact.

Only one of Ks_even Table and Ks_odd Table is used in the key table during the decryption so that the data key in an unused key table can be updated. As mentioned above, the update of the data key is executed by the CPU 10, but the CPU 10 and the decryptor A are not operated in timing in synchronization with each other. Accordingly, the CPU 10 non-synchronously writes the updated data key.

Figure 13:
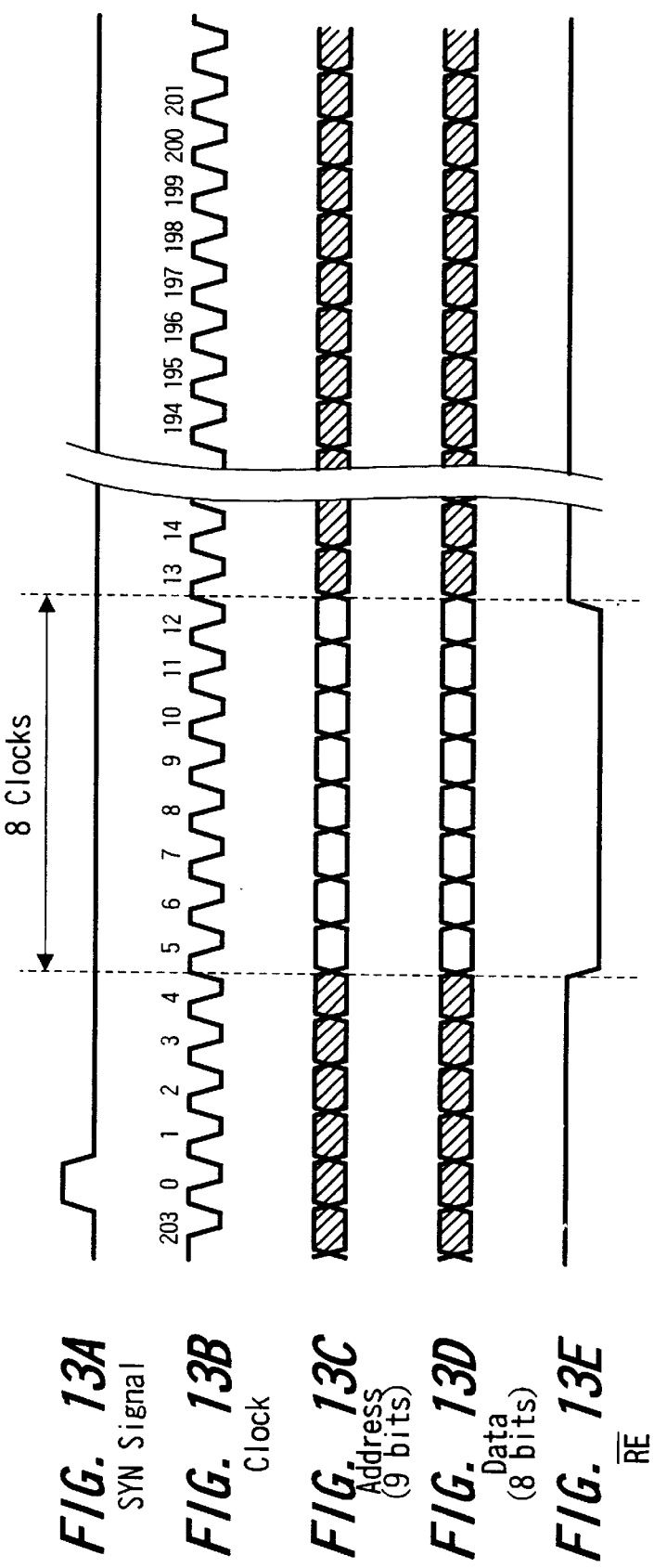
FIG. 13A–E is a view showing an example of read timing of a DPMEM in the decryptor shown in FIG. 5.

Therefore, there is a case in which writing and reading operations of the data key are simultaneously performed at the same address in a dual port memory 17 storing the key table thereinto as mentioned above. FIG. 13 shows a timing example at this time. When an inverting signal RE of an 8-clock width is generated in timing shown in FIG. 13, the writing operation at the same address from the CPU 10 is inhibited as mentioned above in this 8-clock period.

There is a case in which the same PID is stored to the PID table by a certain cause. For example, the PID information of 12 kinds at its maximum per one channel is set. However, when no PID information of 12 kinds is required, it is not necessary to write the PID information of 12 kinds to the PID table. Accordingly, in this case, only the PID information of required kinds is written to the PID table. Therefore, there is a case in which data in an unwritten PID column accidentally become the same data as the PID.

In such a case, there is a fear that an incorrect data key is read and no decryption can be performed. Accordingly, such a fear can be prevented as follows in the present invention.

Figure 11:
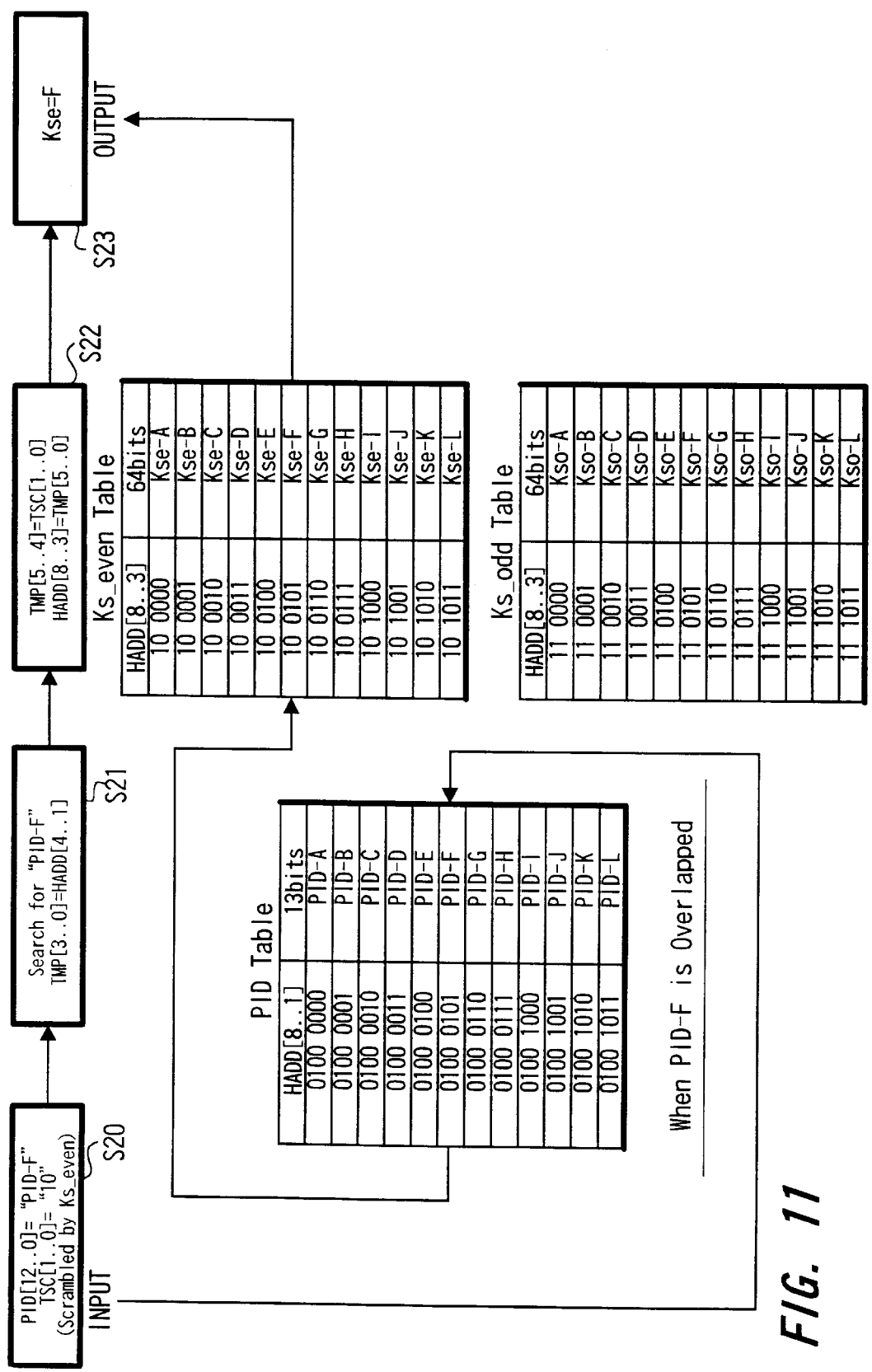
FIG. 11 is a view for explaining an operation of the decryptor when PIDs overlap in a PID table.

As shown in FIG. 11, when there are plural information "PID-F" in the PID-table, a smaller value of the address HADD among these information PID-F is set to have priority. This is because an error probability at a larger value of the address HADD is high since a writing operation to the PID table is performed from the smaller value of the address HADD.

Thus, when "PID-F" is inputted as the PID information, "01000101" is obtained as address HADD[8..1] and processing similar to the above-mentioned processing is performed so that a data key Kse-F of a 64-bit width is obtained from the Ks_even Table.

Figure 12:
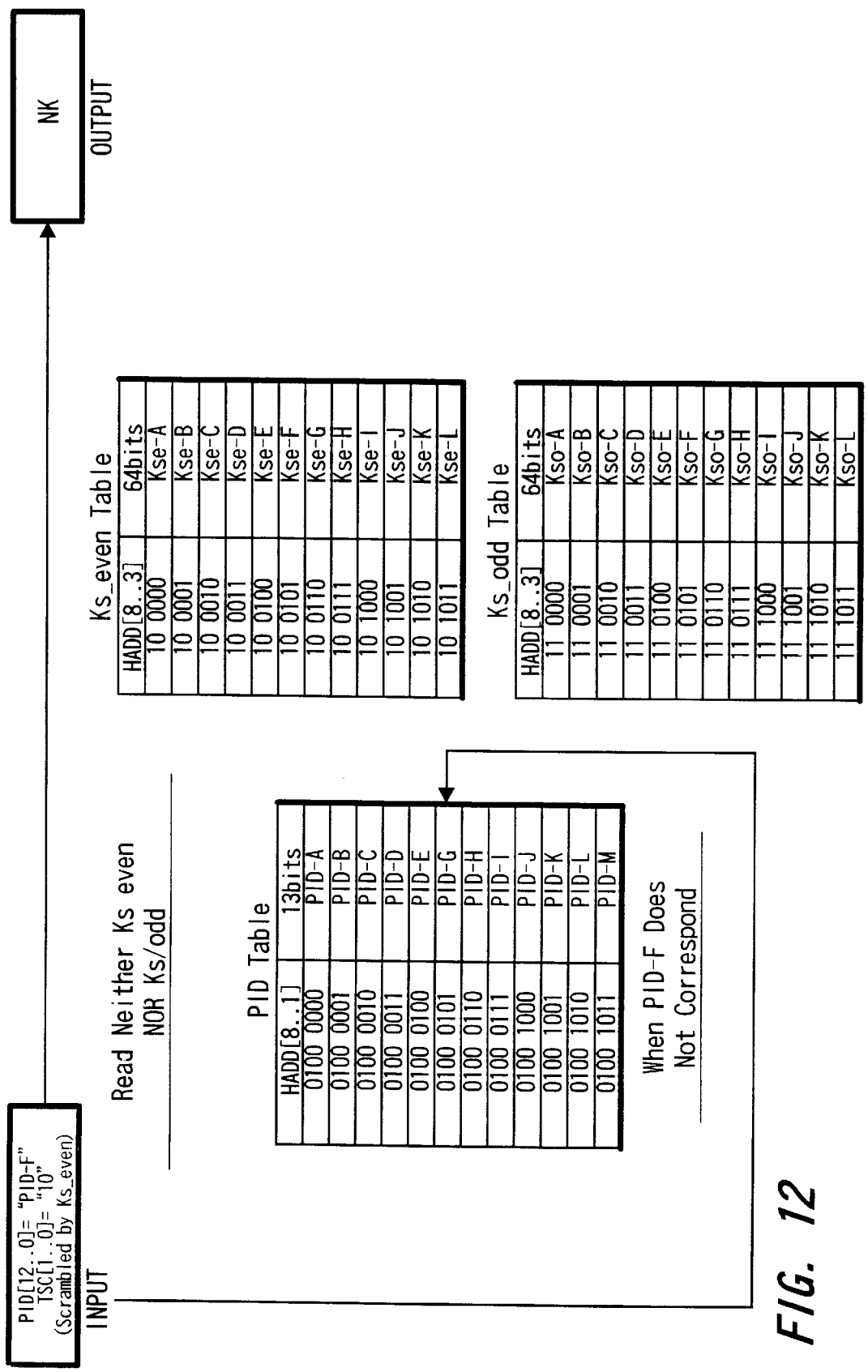
FIG. 12 is a view for explaining an operation of the decryptor when no corresponding PID exists in the PID table.

There is a case in which there is no corresponding PID even when the PID table is referred by the PID information from the header of input data. For example, as shown in FIG. 12, there is no PID corresponding to "PID-F" in the PID table even when "PID-F" is inputted as the PID information.

In such a case, any one of the Ks_even Table and the Ks_odd Table is not read in the key table and no data key is read. In this case, TS as input data is outputted as it is.

Figure 14:
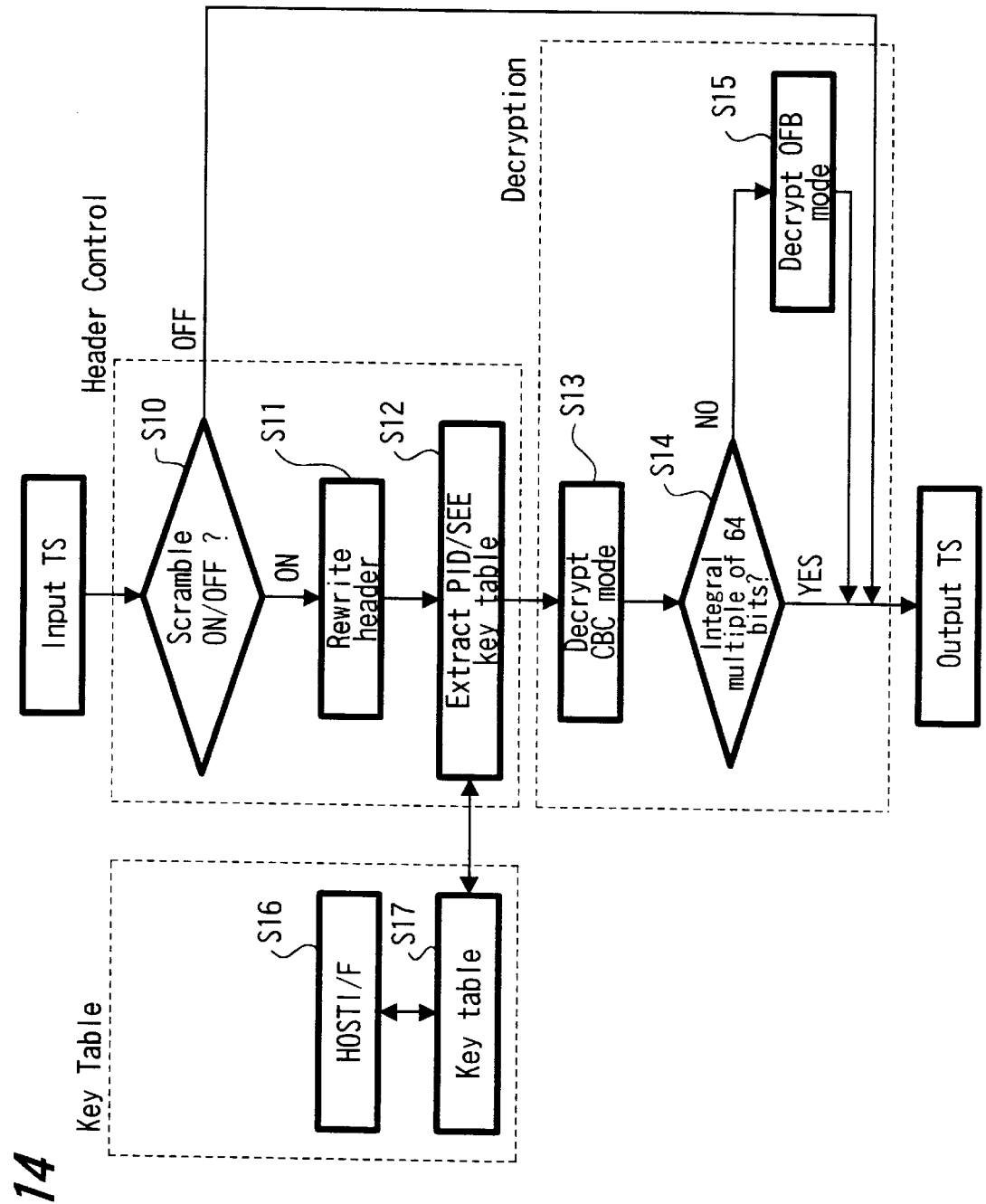
FIG. 14 is a flow chart showing a decrypting flow of the decryptor shown in FIG. 5.

FIG. 14 shows a decrypting flow of the decryptor A shown in FIG. 5. When a transport stream (TS) is inputted, it is judged in a step S10 whether this transport stream is scrambled or not. This judgment is made by detecting whether a flag in a header showing a scrambled state is on or off. When the flag is on, it is judged that the scramble is on and it proceeds to a step S11. In this step S11, a desirable flag, etc. are rewritten. Next, in a step S12, PID information is extracted from the header and the key table is referred. In this case, a key table hostinterface-processed in a step 516 of key table processing and written in a step S17 is referred.

Processing in the step S12 is the above processing shown in FIG. 10.

The above processings from the step S10 to the step S12 are header control processing. When it is judged in the step S10 that the scramble is off, TS is outputted as it is.

Next, decryption processing in the CBC mode is performed in a step S13. In a step S14, it is judged whether or not a decrypted cipher text shows an integer times 64 bits. When there is a fraction in the cipher text and this judgment is NO, decryption processing in the OFB mode is performed with respect to a fractional portion in a step S15 and a decrypted plain text is outputted. In contrast to this, when it is judged in the step S14 that the cipher text shows an integer times 64 bits, a decrypted plain text of 64 bits is outputted.

The decrypting flow as shown in FIG. 14 is executed by the above decryption algorithm shown in FIG. 2. The decryption algorithm shown in FIG. 2 is constructed as mentioned above. Accordingly, an explanation of this decryption algorithm is omitted here. However, detailed constructions for executing the decryption algorithm and an encryption algorithm in the decryption algorithm will next be explained with reference to FIGS. 15 to 19.

Figure 15:
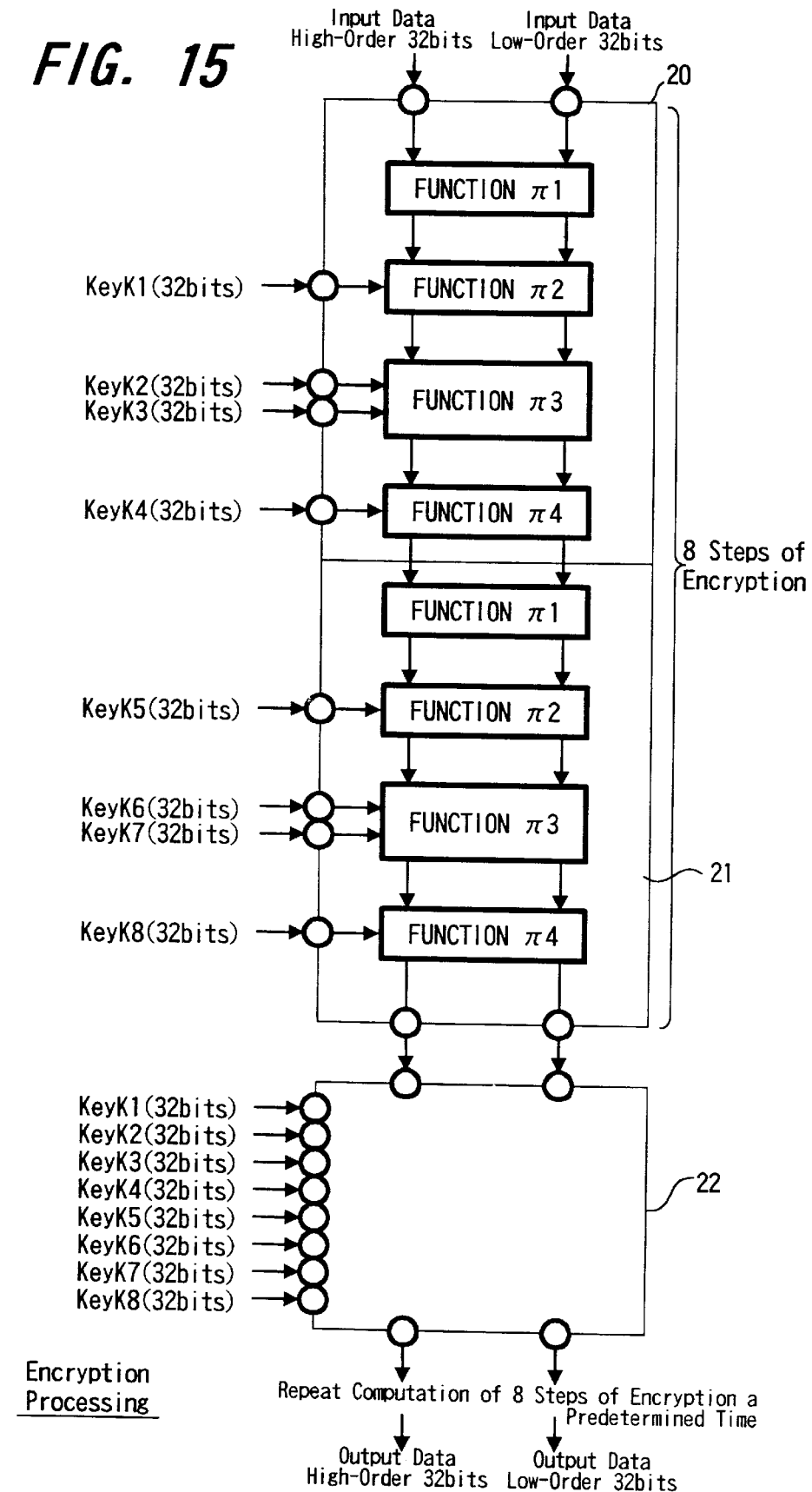
FIG. 15 is a view showing the construction of encryption processing.

FIG. 15 shows the construction of encryption processing for executing the encryption algorithm. In FIG. 15, input data of a 64-bit width are divided into data of upper 32 bits and data of lower 32 bits and are inputted to first encrypting eight stages. The encrypting eight stages are constructed such that four arithmetic stages for calculating functions are repeated twice. A function $\pi 1$ is calculated at a first stage of an arithmetic stage 20 with respect to the inputted data of the upper 32 bits and the inputted data of the lower 32 bits. Next, a function $\pi 2$ is calculated at a second stage with respect to an output of the first stage. In this case, a work key K1 of a 32-bit width is inputted to the second stage and the calculation at the second stage is made by using this work key K1.

Further, a function $\pi 3$ is calculated at a third stage with respect to an output of the second stage. In this case, work keys K2 and K3 of a 32-bit width are inputted to the third stage and the calculation at the third stage is made by using these work keys K2 and K3. Subsequently, a function $\pi 4$ is calculated at a fourth stage with respect to an output of the third stage. In this case, a work key K4 of a 32-bit width is inputted to the fourth stage and the calculation at the fourth stage is made by using this work key K4.

The calculation of a function $\pi 1$ with respect to an output from the arithmetic stage 20 is made at a first stage of an arithmetic stage 21 for making calculations at the remaining four stages. Next, the calculation of a function $\pi 2$ with respect to an output of this first stage is made at a second stage. In this case, a work key K5 of a 32-bit width is inputted to the second stage and the calculation at the second stage is made by using this work key K5.

Further, the calculation of a function $\pi 3$ with respect to an output of the second stage is made at a third stage of the arithmetic stage 21. In this case, work keys K6 and K7 of a 32-bit width are inputted to the third stage and the calculation at the third stage is made by using these work keys K6 and K7. Subsequently, the calculation of a function $\pi 4$ with respect to an output of the third stage is made at a fourth stage. In this case, a work key K8 of a 32-bit width is inputted to the fourth stage and the calculation at the fourth stage is made by using this work key K8.

Thus, the encrypted data of a 64-bit width in total composed of the upper 32 bits and the lower 32 bits are further inputted to encrypting eight stages 22. At the encrypting eight stages 22, calculations similar to those at the above-mentioned encrypting eight stages are made so that random output data of a 64-bit width in total composed of upper 32 bits and lower 32 bits are obtained.

As shown in FIG. 15, the number of repeating times at the encrypting eight stages is not limited to two, but can be set to a desirable repetitious number. As the number of repeating times is increased, the output data can be set at random in a high degree and an encrypting degree can be strengthened.

A character replacing operation for replacing certain characters with another characters in accordance with a constant rule and a transposing operation for replacing an order of the characters with another order are performed in the functional calculation made at each of the arithmetic stages.

Figure 16:
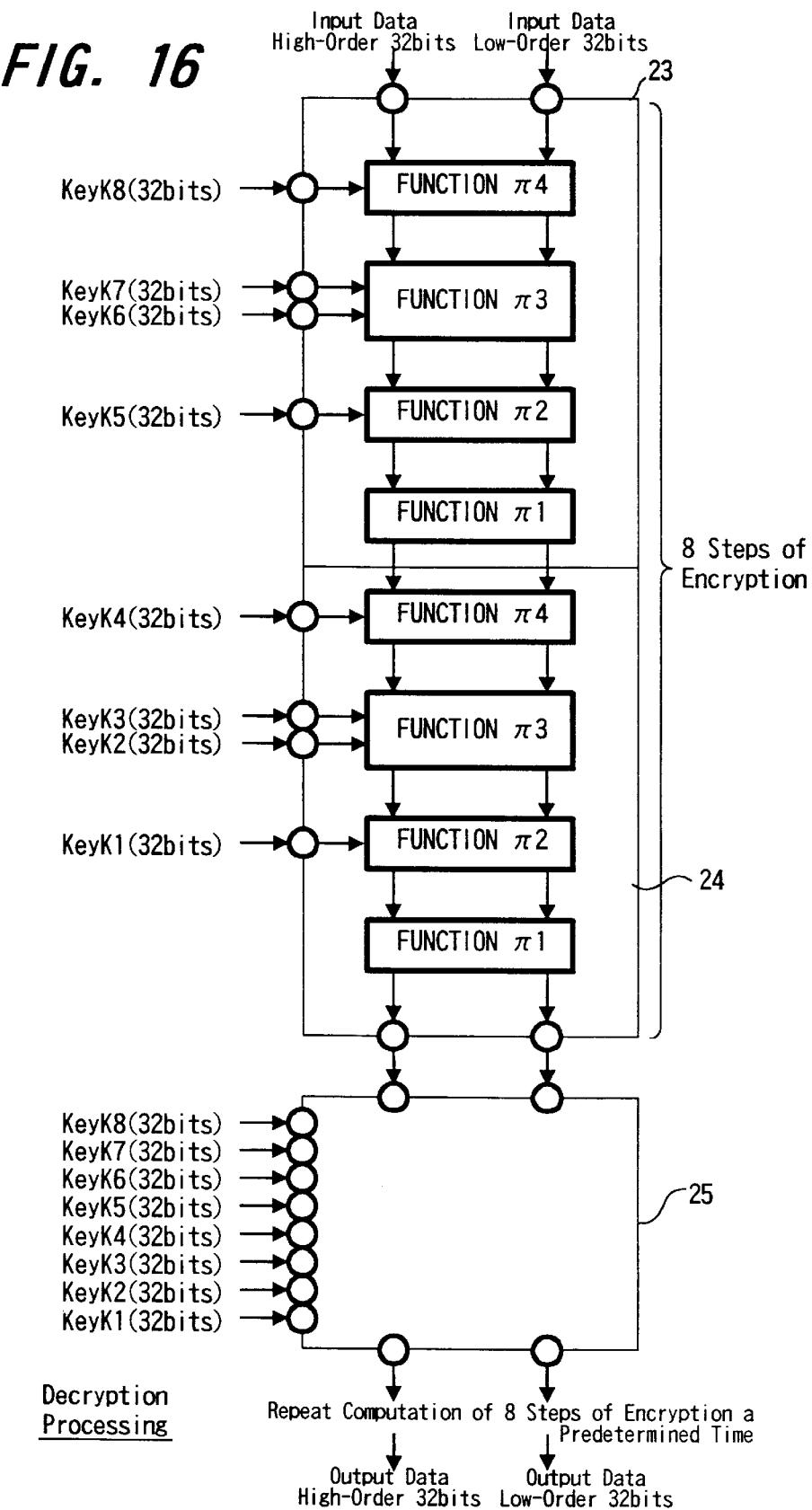
FIG. 16 is a view showing the construction of decryption processing.

FIG. 16 shows the construction of decryption processing for executing the decryption algorithm. This construction differs from the above encryption processing in that calculations are reversely made from an output side of the construction of encryption processing. Namely, at an arithmetic stage 23 constituting first four stages among encrypting eight stages, the calculation of a function $\pi 4$ is made by using a work key K8 of a 32-bit width with respect to encrypted input data of a 64-bit width divided into upper 32 bits and lower 32 bits. Next, at a second stage, the calculation of a function $\pi 3$ is made by using a work key K7 with respect to output data at the first stage. Further, at a third stage, the calculation of a function $\pi 2$ is made by using work keys K6 and K7 with respect to output data at the second stage. Furthermore, at the third stage, the calculation of the function $\pi 2$ is made by using a work key K5 with respect to the output data at the second stage. At a fourth stage, the calculation of a function $\pi 1$ is made with respect to output data at the third stage.

Such calculations at the four stages are similarly made by using work keys K4 to K1 at an arithmetic stage 24.

Further, the above-mentioned calculations at the encrypting eight stages are also executed at encrypting eight stages 25 longitudinally connected to each other so that decrypted output data of a 64-bit width in total composed of upper 32 bits and lower 32 bits are obtained. The number of repeating times at the encrypting eight stages is set to the same number of times as the number of repeating times at the encrypting eight stages executed in,the encrypting processing.

A detailed calculation made at each of the arithmetic stages will next be explained in detail with the arithmetic stage 20 of the encryption processing as an example with reference to FIG. 17.

In the calculation of the function al at the first stage, upper bits divided into inputted 32 bits are outputted as they are without making any calculation. An exclusive-OR operation of the upper and lower bits is performed so that an exclusive-OR value is outputted as lower bits.

In the subsequent calculation of the function 3 $\pi 2$ at the second stage, a work key K1 is added to data x of lower 32 bits so that x+K1 is first calculated. Next, when x+K1 is set to y, y is left-hand-cyclically shifted by one bit and z is obtained by adding y−1 to this shifted value. Next, z is left-hand-cyclically shifted by 4 bits and an exclusive-OR value of this shifted value and z is obtained. An exclusive-OR operation of this obtained result and the upper 32 bits is performed so that calculated data of the upper 32 bits are outputted. In this case, inputted data of the lower 32 bits are outputted as they are without making any calculation.

In the calculation of the function $\pi 3$ at the third stage, a work key K2 is added to data x of the upper 32 bits so that x+K2 is first calculated. Next, when x+K2 is set to y, y is left-hand-cyclically shifted by two bits and z is obtained by adding y+1 to this shifted value. Next, z is left-hand-cyclically shifted by 8 bits and an exclusive-OR value a of this shifted value and z is obtained.

Further, a work key K3 is added to the value a so that a+K3 is calculated. Next, when a+K3 is set to b, b is left-hand-cyclically shifted by one bit and c is obtained by adding −b to this shifted value. Next, an exclusive-OR operation is performed between a logical OR of a and x every bit and a value obtained by left-hand-cyclically shifting c by 16 bits. An exclusive-OR operation of this arithmetic result and data of the lower 32 bits is performed so that calculated data of the lower 32 bits are outputted. The data of the upper 32 bits are outputted as they are without making any calculation.

Furthermore, in the calculation of the function π4 at the fourth stage, a work key K4 is added to data x of the lower 32 bits so that x+K4 is first calculated. Next, when x+K4 is set to y, y is left-hand-cyclically shifted by two bits and y+1 is added to this shifted value. An exclusive-OR operation of this arithmetic result and the upper 32 bits is performed so that calculated data of the upper 32 bits are outputted. In this case, the data of the lower 32 bits are outputted as they are without making any calculation.

In the above calculations, the work keys K1 to K4 are added to data so that character replacing processing for replacing characters with another characters is performed and a transposing operation for replacing positions of the characters is performed by cyclically shifting these data. Thus, a plain text is encrypted to a cipher text by executing algorithms of the character replacement and the transposing operation.

In a decrypting case, algorithms of a character replacement and a transposing operation reverse to those in the encryption are executed so that the cipher text can be decrypted to an original text.

Figure 18:
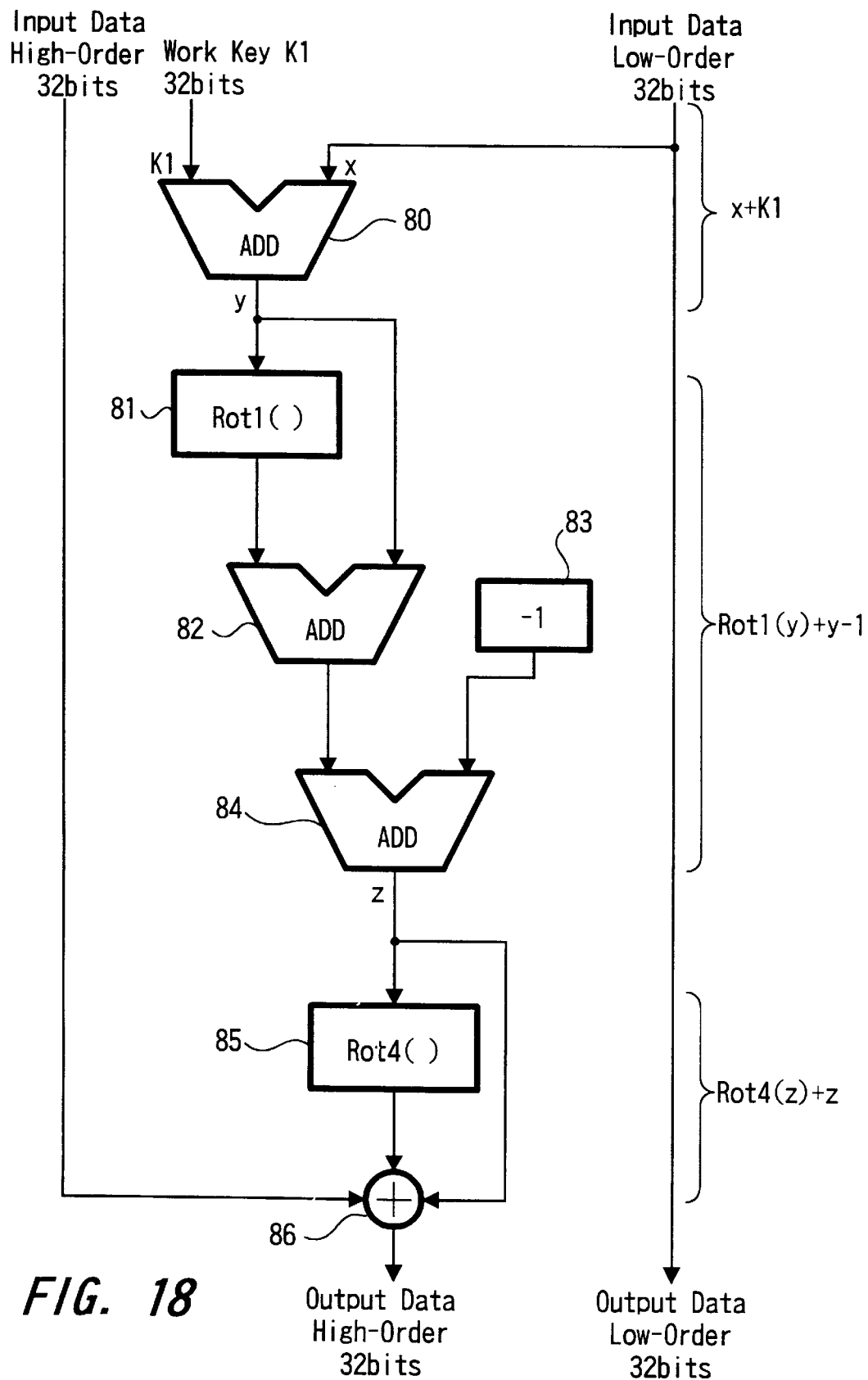
FIG. 18 is a view showing a detailed construction for calculating a function $\pi2$ among the basic functions.

The construction for calculating the above-mentioned functions will be further explained in detail with the function π2 as an example with reference to FIG. 18.

In FIG. 18, input data x of lower 32 bits and a work key K1 of 32 bits are added to each other in a first adder Add80 so that added data y is outputted. This added data y is left-hand-cyclically shifted by one bit in a first left-hand-cyclic shifter 81 and is added to an output of the first left-hand-cyclic shifter 81 in a second adder 82. In a third adder 84, −1 is added to this added result so that data z is calculated. This data z is left-hand-cyclically shifted by 4 bits in a second left-hand-cyclic shifter 85 and is supplied to an exclusive-OR circuit 86. Output data of the second left-hand-cyclic shifter 85, the data z, input data of upper 32 bits are inputted to this exclusive-OR circuit 86 so that an exclusive-OR operation of these three data is performed.

This arithmetic result becomes input data of the upper 32 bits inputted to the next stage. The input data of the lower 32 bits are inputted to the next stage without making any calculation.

Figure 19:
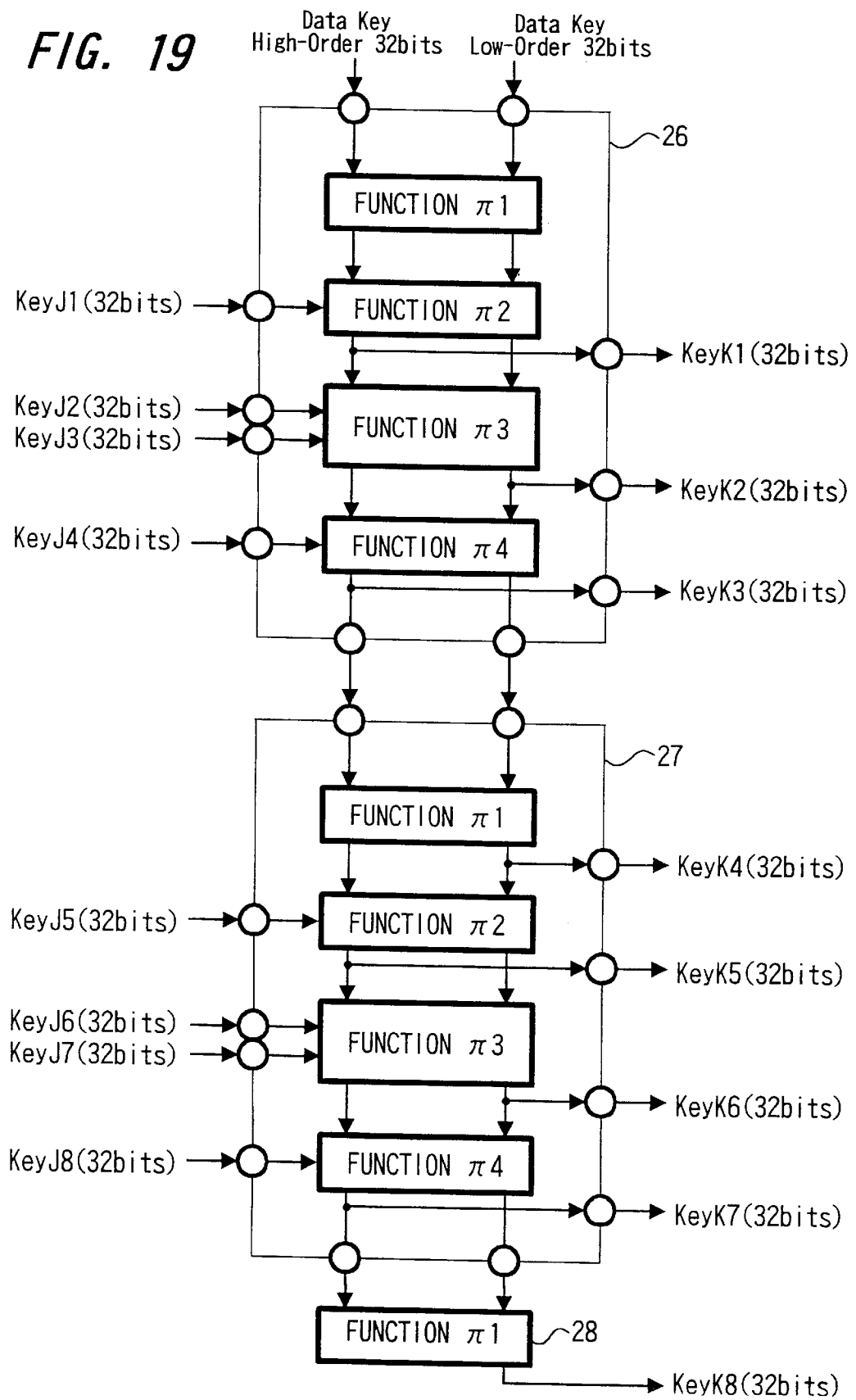
FIG. 19 is a view showing the construction of key schedule processing.

FIG. 19 shows the construction of key schedule processing for generating a work key of a 256-bit width from a data key of a 64-bit width and a system key of a 256-bit width.

As shown in FIG. 19, the key schedule processing is constructed such that each of two arithmetic stages 26 and 27 is composed of four stages and one arithmetic stage 28 is composed of one stage. The arithmetic stages 26 and 27 and the arithmetic stage 28 are constructed such that these stages are longitudinally connected to each other as one stage. The calculation of a function π1 is made at a first stage at each of the arithmetic stages 26 and 27 each composed of four stages. The calculation of a function π2 is made at a second stage. The calculation of a function π3 is made at a third stage. Further, the calculation of a function π4 is made at a fourth stage.

Such an arithmetic algorithm is similar to the above-mentioned algorithm of the encryption processing. Accordingly, an explanation of this arithmetic algorithm is omitted here. In the key schedule processing, input data are set to a data key of 64 bits and functions π1 to π4 are calculated by using system keys J1 to J8 each composed of 32 bits so that eight work keys K1 to K8 of 32 bits are respectively generated. In this case, the arithmetic algorithm differs from the above-mentioned algorithm of the encryption processing in that the calculations are made at nine stages on the whole and the function π1 is calculated at the final stage.

Output data of the upper 32 bits after the calculation of the function π2 at the arithmetic stage 26 are outputted as the work key K1. Output data of the lower 32 bits after the calculation of the function π3 are outputted as the work key K2. Output data of the upper 32 bits after the calculation of the function π4 are outputted as the work key K3.

Further, output data of the lower 32 bits after the calculation of the function π1 at the arithmetic stage 27 are outputted as the work key K4. Output data of the upper 32 bits after the calculation of the function π2 are outputted as the work key K5. Output data of the upper 32 bits after the calculation of the function π3 are outputted as the work key K6. Output data of the upper 32 bits after the calculation of the function π4 are outputted as the work key K7. Output data of the lower 32 bits after the calculation of the function π1 at the final stage 28 are outputted as the work key K8.

Figure 17:
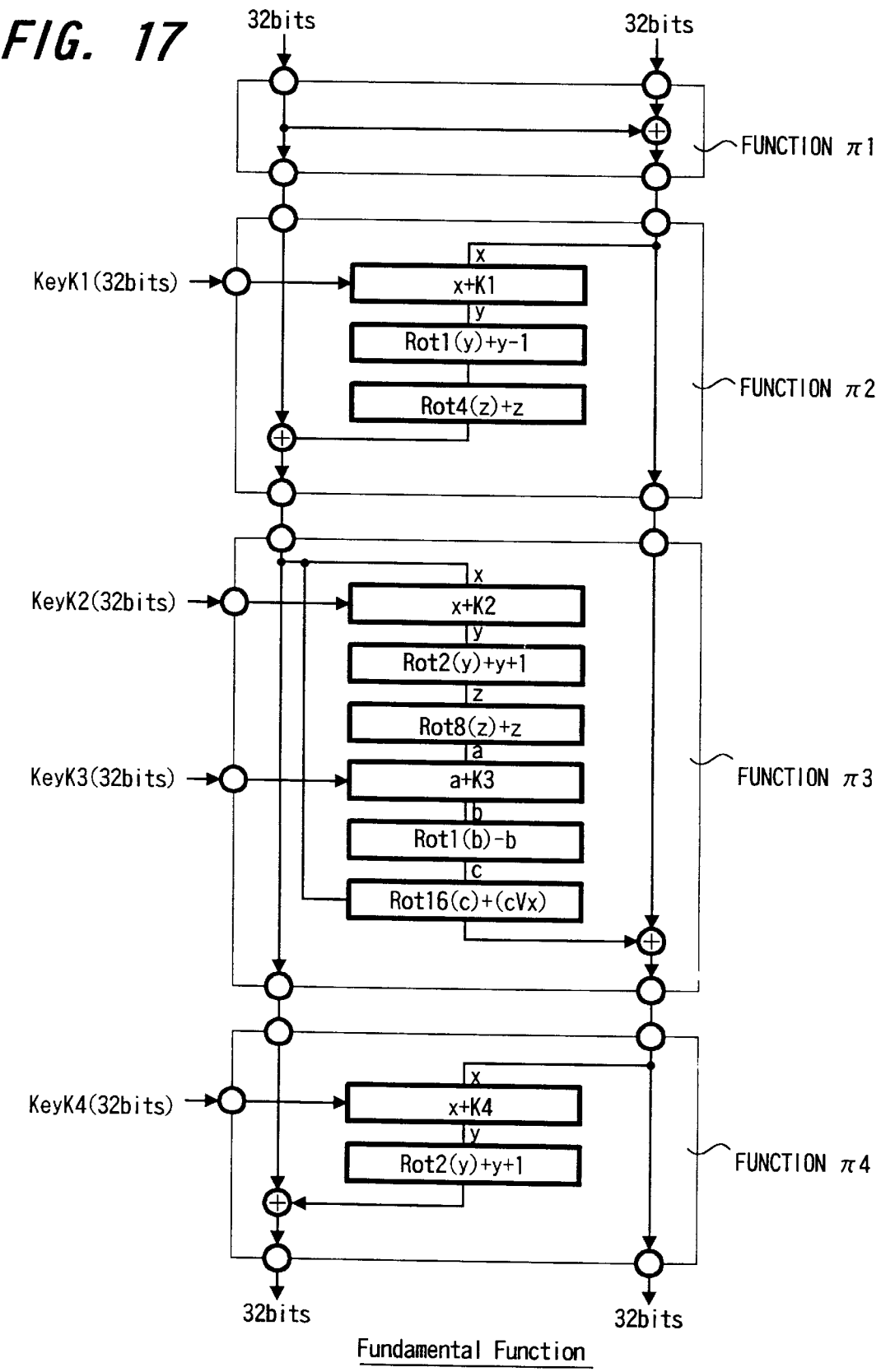
FIG. 17 is a view showing basic functions in detail in the encryption processing.
Figure 20B:
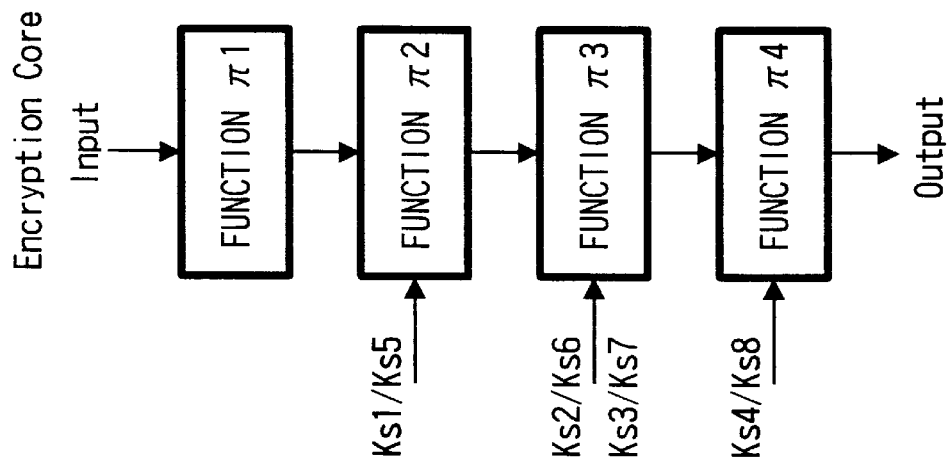
FIG. 20A–B is a view showing the constructions of an encryptor core and a decryptor core.
Figure 20A:
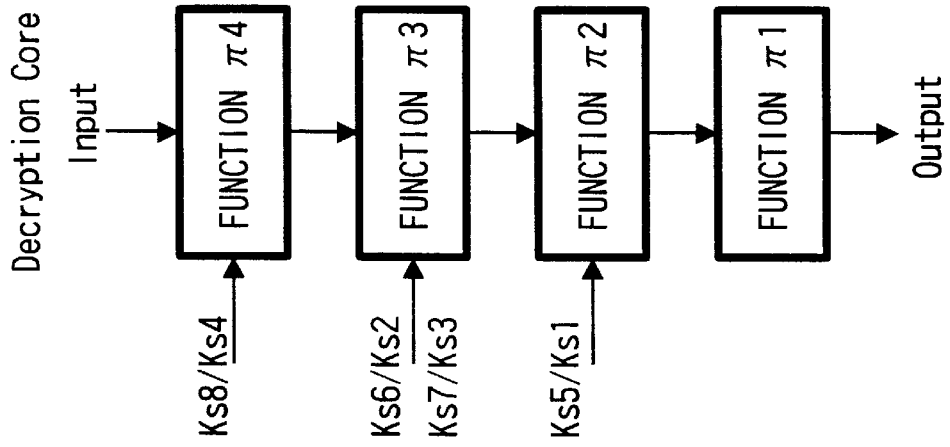

The constructions of four arithmetic stages, i.e., arithmetic algorithms are set to be equal to each other with reference to the above encryption processing shown in FIG. 15 and the above key schedule processing shown in FIG. 17. Calculations at these four arithmetic stages are repeatedly made so that the encryption processing or the key schedule processing can be executed. Accordingly, if an arithmetic core is constructed as shown in FIG. 20A such that the arithmetic stages of the functions π1 to π4 are longitudinally connected to each other, the encryption processing or the key schedule processing can be executed by repeatedly executing the arithmetic core.

Figure 4:
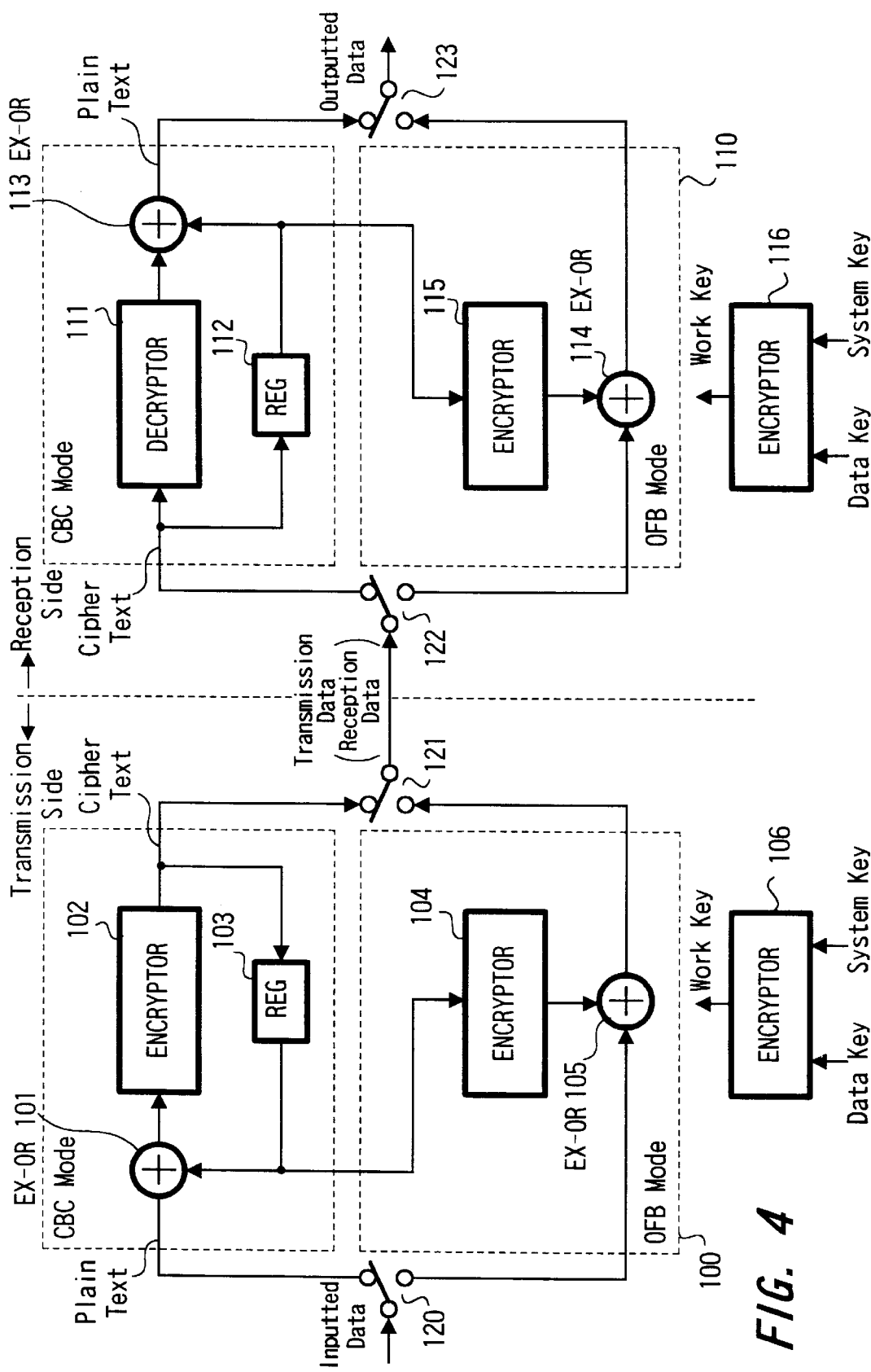
FIG. 4 is a view showing the construction of a conventional encrypting decrypting system.

This arithmetic core generates a work key from the data key and the system key shown in FIG. 4 and corresponds to an encryptor performing the encryption processing in the CBC mode and the OFB mode and is set to an encryptor core. In this case, data keys Ks1 to Ks4 and data keys Ks5 to Ks8 are supplied to the encryptor core in time division.

The constructions of the four arithmetic stages, i.e., arithmetic algorithms are set to be equal to each other with reference to FIG. 16. Decryption processing can be executed by repeating calculations at these four arithmetic stages. Accordingly, if a decryption arithmetic core is constructed as shown in FIG. 20B such that the arithmetic stages of the functions π4 to π1 are longitudinally connected to each other, the decryption processing can be executed by repeatedly executing the decryption arithmetic core.

This decryption arithmetic core corresponds to the decryptor performing the decryption processing in the CBC mode and the OFB mode shown in FIG. 4 and is set to a decryptor core. In this case, the data keys Ks8 to Ks5 and the data keys Ks4 to Ks1 are supplied to the decryptor core in time division.

Thus, the algorithms of the encryption processing and the key schedule can be executed by repeatedly executing the encryptor core, and the decryption algorithm can be executed by repeatedly executing the decryptor core.

The above explanation relates to the decryptor for executing the decrypting method of the present invention. An electronic device of the present invention is constructed by a tuner, a television device, etc. having at least such a decryptor.

In the above explanation, a plain text of a 64-bit block is generated from a cipher text of a 64-bit block by using a data key of 64 bits and a system key of 256 bits. However, the present invention is not limited to these numeric values, but arbitrary numeric values can be set in the present invention.

Further, the present invention is not limited to an encrypting decrypting system for repeating the above transposing operation and the character replacement, but can be also applied to another encrypting decrypting system.

Since the present invention is constructed as above, it is possible to suitably control reading and writing operations of a memory means into which key information for performing the decryption processing is stored. Therefore, a decrypting method capable of easily performing the memory control can be provided. Accordingly, it is possible to provide a decrypting method capable of executing all decryption processings in real time on a reception side.

Further, the construction of a memory control means in an electronic device having a decrypting means for executing such a decrypting method can be reduced in size so that the electronic device can be made compact and cheaply manufactured.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A decrypting method comprising the steps of:

writing plural key information to memory means;

reading any one of the key information designated by information in k-bit input data from said memory means, the read key information being read from a key address that is generated by encoding said k-bit input data to form m-bit data and concatenating said m-bit data with n-bit data, wherein k, m and n are integers greater than or equal to one and k is greater than m+n, such that said m+n-bit key address is shorter than said k-bit input data;

decrypting said input data on the basis of key information read in the reading step; and inhibiting the writing step when executing periods of said writing step and said reading step overlap each other and write and read addresses are in conformity with each other.

2. An electronic device comprising at least decrypting means for executing the decrypting method claimed in claim 1.

3. A decrypting method comprising the steps of:

reading any one of key information from memory means storing plural key information on the basis of k-bit input data, the read key information being read from a key address that is generated by encoding said k-bit input data to form m-bit data and concatenating said m-bit data with n-bit data, wherein k, m and n are integers greater than or equal to one and k is greater than m+n such that said key address is shorter than said k-bit input data; and decrypting said input data on the basis of the key information read in the reading step;

said reading step being set such that a least key address is selected when two or more key addresses are assigned the same key information.

4. An electronic device comprising at least decrypting means for executing the decrypting method claimed in claim 3.

5. A decrypting method comprising the steps of:

reading any one of key information from memory means storing plural key information on the basis of k-bit input data, the read key information being read from a key address that is generated by encoding said k-bit input data to form m-bit data and concatenating said m-bit data with n-bit data, wherein k, m and n are integers greater than or equal to one and k is greater than m+n, such that said m+n-bit key address is shorter than said k-bit input data; and decrypting said input data on the basis of the key information read in the reading step;

said reading step being set such that no key information is read when there is no key address corresponding to the k-bit input data.

6. An electronic device comprising at least decrypting means for executing the decrypting method claimed in claim 5.

7. A decrypting method comprising the steps of:

performing an initializing operation;

writing plural key information to memory means;

reading any one of the key information from said memory means on the basis of k-bit input data, the read key information being read from a key address that is generated by encoding said k-bit input data to form m-bit data and concatenating said m-bit data with n-bit data, wherein k, m and n are integers greater than or equal to one and k is greater than m+n, such that said m+n-bit key address is shorter than said k-bit input data; and decrypting said input data on the basis of the key information read in the reading step; with the processing being performed in the initializing step being such that no key addresses are generated within an initializing period.

8. An electronic device comprising at least decrypting means for executing the decrypting method claimed in claim 7.

* * * * *